US012809025B2

(12) United States Patent
Piggott

(10) Patent No.: US 12,809,025 B2
(45) Date of Patent: Nov. 24, 2026

(54) INTERFERENCE-BASED SUPPRESSION OF INTERNAL RETRO-REFLECTIONS IN COHERENT SENSING DEVICES

(71) Applicant: Waymo LLC, Mountain View, CA (US)

(72) Inventor: Alexander Yukio Piggott, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 1102 days.

(21) Appl. No.: 17/947,904

(22) Filed: Sep. 19, 2022

(65) Prior Publication Data

US 2024/0103167 A1 Mar. 28, 2024

(51) Int. Cl.
*G01S 17/34* (2020.01)
*G01S 7/481* (2006.01)
*G01S 7/4912* (2020.01)

(52) U.S. Cl.
CPC ............ *G01S 17/34* (2020.01); *G01S 7/4817* (2013.01); *G01S 7/4917* (2013.01)

(58) Field of Classification Search
CPC ....... G01S 17/34; G01S 7/4817; G01S 7/4917
See application file for complete search history.

(56) References Cited

U.S. PATENT DOCUMENTS 8,112,223 B2 2/2012 Jordan et al.
9,513,497 B2 12/2016 Guzzon et al.
9,851,470 B2 12/2017 Henderson
10,436,906 B2 10/2019 Droz
10,686,523 B1 6/2020 Gleason et al.
11,112,503 B2 9/2021 Fried et al.
12,061,249 B1 * 8/2024 Loui ....................... G01S 13/90
2002/0159128 A1 10/2002 Green
2010/0001744 A1 1/2010 Hirayama et al.
2014/0254972 A1 9/2014 Fujino et al.
2018/0128974 A1 5/2018 Iida et al.
(Continued)

OTHER PUBLICATIONS

Aalto et al., "Open-Access 3-μm SOI Waveguide Platform for Dense Photonic Integrated Circuits", in IEEE Journal of Selected Topics in Quantum Electronics, vol. 25, No. 5, pp. 1-9 (2019).
(Continued)

*Primary Examiner* — Yuqing Xiao
*Assistant Examiner* — Isabelle Lin Boegholm
(74) *Attorney, Agent, or Firm* — Christensen O'Connor Johnson Kindness PLLC

(57) ABSTRACT

The subject matter of this specification can be implemented in, among other things, systems and methods of optical sensing that use destructive interference to suppress retro-reflected light during generation of sensing beams. Described, among other things, is a system to produce a transmitted (TX) beam and collect a received (RX) beam. The RX beam can include a reflected beam caused by interaction of the TX beam with an object, and a retro-reflected (RR) beam caused by interaction of the TX beam internal components of the system. The system is further to combine the RX beam with a phase-controlled beam to obtain a combined beam, control a phase of the phase-controlled beam to cause destructive interference of the phase-controlled beam and the RR beam, and determine, using the combined beam, one or more of the characteristics of the object.

20 Claims, 7 Drawing Sheets

(56) References Cited

U.S. PATENT DOCUMENTS

| | | | |
|---|---|---|---|
| 2018/0372951 A1 | 12/2018 | Hashiya et al. | |
| 2019/0391243 A1 | 12/2019 | Nicolaescu | |
| 2020/0249351 A1* | 8/2020 | Chen | G01S 7/4817 |
| 2020/0256958 A1 | 8/2020 | Piggott | |
| 2021/0382142 A1 | 12/2021 | Rogers et al. | |
| 2021/0405290 A1* | 12/2021 | Hayenga | G01S 17/08 |
| 2023/0027271 A1* | 1/2023 | Jin | G01S 17/58 |
| 2025/0013081 A1 | 1/2025 | Menard et al. | |

OTHER PUBLICATIONS

Chung et al., "Low-power thermo-optic silicon modulator for large-scale photonic integrated systems", Opt. Express 27, 13430-13459 (2019).
Cook, et al., "Polysilicon Grating Switches for LiDAR", Journal of Microelectromechanical Systems, vol. 29, No. 5, pp. 1008-1013 (2020).
Dickson et al., "Holographic polarization-separation elements", Appl. Opt. 33, 5378-5385 (1994).
Gajda et al., "Design rules for p-i-n diode carriers sweeping in nano-rib waveguides on SOI", Opt. Express 19, 9915-9922 (2011).
Inoue et al., "Demonstration of a new optical scanner using silicon photonics integrated circuit", Opt. Express 27, 2499-2508 (2019).
Lalanne et al., "A transmission polarizing beam splitter grating", Journal of Optics A: Pure and Applied Optics, vol. 1, No. 2 (1999).
Lee et al., "Silicon Photonic Switch Fabrics: Technology and Architecture", Journal of Lightwave Technology, vol. 37, No. 1, pp. 6-20 (2019).
Li et al., "Lens-based integrated 2D beam-steering device with defocusing approach and broadband pulse operation for Lidar application", Opt. Express 27, 32970-32983 (2019).
Marchetti, et al., "Coupling strategies for silicon photonics integrated chips [Invited]", Photon. Res. 7, 201-239 (2019).
Masood et al., "Comparison of heater architectures for thermal control of silicon photonic circuits", 10th International Conference on Group IV Photonics, (2013).
Michaels A., EMOpt (2020), https://emopt.readthedocs.io/en/latest/tutorial_2D_grating_coupler.html.
Mu et al., "Edge Couplers in Silicon Photonic Integrated Circuits: A Review", Applied Sciences, 2020, vol. 10, 29 pages.
Oh et al., "Achromatic diffraction from polarization gratings with high efficiency", Opt. Lett. 33, 2287-2289 (2008).
Piggott, A., "Understanding the physics of coherent LiDAR", arXiv:2011.05313 (2020).
Rogers et al., "A universal 3D imaging sensor on a silicon photonics platform", Nature 590, 256-261 (2021).
Rong et al., "An all-silicon Raman laser", Nature 433, 292-294 (2005).
Tu et al., "State of the Art and Perspectives on Silicon Photonic Switches", Micromachines 2019, 10, 51.
Turner-Foster et al., "Ultrashort free-carrier lifetime in low-loss silicon nanowaveguides", Opt. Express 18, 3582-3591 (2010).
Aeye iDAR "iDAR is Smarther than LiDAR", aeye.ai/idar/, retrieved Oct. 20, 2020, 11 pages.
Aurora "FMCW Lidar: The Self-Driving Game-Changer" medium.com/aurora-blog/fmcw-lidar-the-self-driving-game-changer-194fd311fd0e9, Apr. 9, 2020, retreived on Oct. 20, 2020, 6 pages.
GreenCarCongress.com "Aeva Announces Aeries 4D FMCW Lidar-on-chip for Autonomous Driving; Recent Porsche Investment", greecarcongress.com/2019/12/20191212.aeva.html, Dec. 12, 2019, 11 pages.
Lekavich, J., "Basics of Acousto-Optic Devices", Lasers & Applications Apr. 1986, pp. 59-64.
Zhu H., et al., "On-Chip Optical Power Monitor Using Periodically Interleaved P—N Junctions Integrated on a Silicon Waveguide," IEEE Journal of Selected Topics in Quantum Electronics, Jul./Aug. 2014, vol. 20(4), 8 Pages.

* cited by examiner

INTERFERENCE-BASED SUPPRESSION OF INTERNAL RETRO-REFLECTIONS IN COHERENT SENSING DEVICES

TECHNICAL FIELD

The instant specification generally relates to range and velocity sensing in applications that involve determining locations and velocities of moving objects using optical signals reflected from the objects. More specifically, the instant specification relates to elimination or reduction of spurious retro-reflections in light detection and ranging (lidar) devices.

BACKGROUND

Various automotive, aeronautical, marine, atmospheric, industrial, and other applications that involve tracking locations and motion of objects benefit from optical and radar detection technology. A rangefinder (radar or optical) device operates by emitting a series of signals that travel to an object and then detecting signals reflected back from the object. By determining a time delay between a signal emission and an arrival of the reflected signal, the rangefinder can determine a distance to the object. Additionally, the rangefinder can determine the velocity (the speed and the direction) of the object's motion by emitting two or more signals in a quick succession and detecting a changing position of the object with each additional signal. Coherent rangefinders, which utilize the Doppler effect, can determine a longitudinal (radial) component of the object's velocity by detecting a change in the frequency of the arrived wave from the frequency of the emitted signal. When the object is moving away from (or towards) the rangefinder, the frequency of the arrived signal is lower (higher) than the frequency of the emitted signal, and the change in the frequency is proportional to the radial component of the object's velocity. Autonomous (self-driving) vehicles operate by sensing an outside environment with various electromagnetic (radio, optical, infrared) sensors and charting a driving path through the environment based on the sensed data. Additionally, the driving path can be determined based on Global Navigation Satellite System (GNSS) data and road map data. While the GNSS and the road map data can provide information about static aspects of the environment (such as buildings, street layouts, etc.), dynamic information (such as information about other vehicles, pedestrians, cyclists, etc.) is obtained from contemporaneous electromagnetic sensing data. Precision and safety of the driving path and of the speed regime selected by the autonomous vehicle depend on the quality of the sensing data and on the ability of autonomous driving computing systems to process the sensing data and to provide appropriate instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which.

SUMMARY

Figure 1:
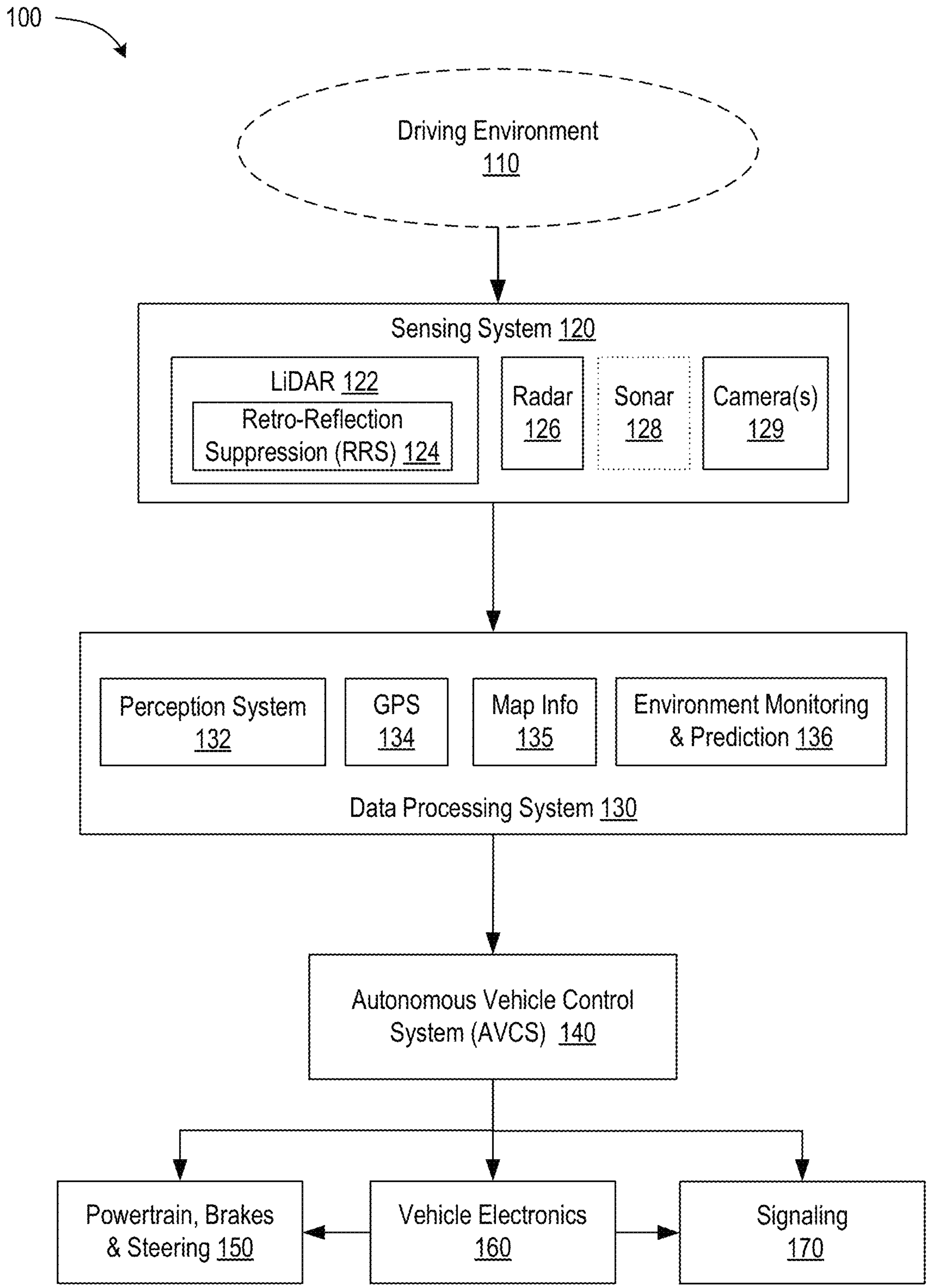
FIG. 1 is a diagram illustrating components of an example autonomous vehicle that can deploy a lidar device capable of suppression of retro-reflections for improved efficiency, accuracy, and speed of target characterization, in accordance with some implementations of the present disclosure.

In one implementation, disclosed is a system that includes a lidar transceiver configured to produce a first transmitted (TX) beam and collect a first received (RX) beam. The first RX beam includes a first reflected beam caused by interaction of the first TX beam with a first object and a first retro-reflected (RR) beam caused by interaction of the first TX beam with one or more internal components of the lidar transceiver. The lidar transceiver is further configured to combine the first RX beam with a phase-controlled beam to obtain a combined beam. The system further includes one or more circuits configured to control a phase of the phase-controlled beam to cause at least partial destructive interference of the phase-controlled beam and the first RR beam, and determine, using the combined beam, one or more of characteristics of the object.

In another implementation, disclosed is a lidar apparatus that includes a photonic integrated circuit (PIC). The PIC can include a light source configured to generate a light beam. The PIC can further include an optical coupler configured to produce, using the light beam, a first transmitted (TX) beam and a second TX beam, and to produce, by combining a first received (RX) beam and a second RX beam, a combined beam. The PIC can further include a first optical interface configured to output the first TX beam and to obtain the first RX beam. The first RX beam includes (i) a first reflected beam caused by interaction of the first TX beam with a first object and (ii) a first retro-reflected (RR) beam caused by the first TX beam. The PIC can further include a second optical interface configured to output the first TX beam and to obtain the second RX beam. The second RX beam includes (i) a second reflected beam caused by interaction of the second TX beam with the first object or a second object and (ii) a second RR beam caused by the second TX beam. The PIC can further include a first phase shifter configured to modify the phase of the second RX beam. The lidar apparatus further includes one or more electronic circuits configured to control settings of the first phase shifter to cause at least partial destructive interference of the first RR beam and the second RR beam, and determine, using the combined beam, one or more characteristics of at least one of the first object or the second object.

In another implementation, disclosed is a method to operate a lidar transceiver. The method includes producing a first transmitted (TX) beam and collecting a first received (RX) beam. The first RX beam includes a first reflected beam caused by interaction of the first TX beam with a first object and a first retro-reflected (RR) beam caused by interaction of the first TX beam with one or more internal components of the lidar transceiver. The method further includes combining the first RX beam with a phase-controlled beam to obtain a combined beam. The method further includes controlling a phase of the phase-controlled beam to cause at least partial destructive interference of the phase-controlled beam and the first RR beam, and determining, using the combined beam, one or more characteristics of the first object.

DETAILED DESCRIPTION

An autonomous vehicle (AV) or a driver-operated vehicle that uses various driver-assistance technologies can employ light detection and ranging (lidar) systems to detect distances to various objects in the environment and, sometimes, the velocities of such objects. A lidar emits one or more laser signals (pulses) that travel to an object and then detects incoming signals reflected from the object. By determining a time delay between the signal emission and the arrival of the reflected waves, a time-of-flight (ToF) lidar can determine the distance to the object. A typical lidar emits signals in multiple directions to obtain a wide view of the driving environment of the AV. The outside environment can be any environment including any urban environment (e.g., a street, and a sidewalk), rural environment, highway environment, indoor environment (e.g., the environment of an industrial plant, a shipping warehouse, and a hazardous area of a building), marine environment, and so on. The outside environment can include multiple stationary objects (e.g., roadways, buildings, bridges, road signs, shoreline, rocks, and trees), multiple movable objects (e.g., vehicles, bicyclists, pedestrians, animals, ships, and boats), and/or any other objects located outside the AV. For example, a lidar device can cover (e.g., scan) an entire 360-degree view by collecting a series of consecutive frames identified with timestamps. As a result, each sector in space is sensed in time increments that are determined by the angular velocity of the lidar's scanning speed. Sometimes, an entire 360-degree view of the outside environment can be obtained over a scan of the lidar. Alternatively, any smaller sector, e.g., a 1-degree sector, a 5-degree sector, a 10-degree sector, or any other sector can be scanned, as desired.

ToF lidars can also be used to determine velocities of objects in the outside environment, e.g., by detecting two (or more) locations $\vec{r}(t_1)$, $\vec{r}(t_2)$ of some reference point of an object (e.g., the front end of a vehicle) and inferring the velocity as the ratio, $\vec{v}=[\vec{r}(t_2)-\vec{r}(t_1)]/[t_2-t_1]$. By design, the measured velocity $\vec{v}$ is not the instantaneous velocity of the object but rather the velocity averaged over the time interval $t_2-t_1$, as the ToF technology does not allow to ascertain whether the object maintained the same velocity $\vec{v}$ during this time or experienced an acceleration or deceleration (with detection of acceleration/deceleration requiring additional locations $\vec{r}(t_3)$, $\vec{r}(t_4)$ . . . of the object).

Coherent or Doppler lidars operate by detecting, in addition to ToF, a change in the frequency of the reflected signal—the Doppler shift—indicative of the velocity of the reflecting surface. Measurements of the Doppler shift can be used to determine, based on a single sensing frame, radial components (along the line of beam propagation) of the velocities of various reflecting points belonging to one or more objects in the outside environment. A signal emitted by a coherent lidar can be modulated (in frequency and/or phase) with a radio frequency (RF) signal prior to being transmitted to a target. A local oscillator (LO) copy of the transmitted signal can be maintained on the lidar and mixed with a signal reflected from the target; a beating pattern between the two signals can be extracted and Fourier-analyzed to determine the Doppler frequency shift of $f_D$ and signal travel time $\tau$ to and from the target. The (radial) velocity V of the target relative to the lidar and the distance L to the target can then be determined as $$V=\frac{cf_D}{2f},\ L=\frac{c\tau}{2}.$$

where c is the speed of light and f is the optical frequency of the transmitted signal. More specifically, coherent lidars can determine the velocity of the target and the distance to the target by correlating phase information $\phi_R(t)$ of the reflected signal with phase modulation $\phi_{LO}(t-\tau)$ of the time-delayed local oscillator (LO) copy of the transmitted signal. The correlations can be analyzed in the Fourier domain with a peak of the correlation function identifying the time of flight $\tau$.

In many lidar devices, the received beam is collected through the same optical interface that outputs the transmitted beam (a monostatic transceiver configuration), e.g., using single-mode optical fibers or single-mode waveguides, e.g., in photonic integrated circuits (PICs). The monostatic configuration has significant advantages as the reflected and the transmitted beams are automatically aligned to the same direction in space (sensing "pixel"). Additionally, the monostatic configuration is more readily scalable than a bi static configuration, in which the transmitting port (interface) is separate from the receiving port. In particular, the monostatic configuration is capable of imaging a higher number of pixels at once, since fewer hardware elements are needed to support each pixel. The monostatic configuration, however, suffers from retro-reflections occurring when the transmitted beam interacts with various internal components of the lidar, e.g., interfaces of waveguides (optical fibers), optical gratings, couplers, circulators, beam splitters, combiners, and the like. Surface imperfections of waveguides and fibers can also contribute to retro-reflections. Because target objects can be located at substantial distances from the lidar device, retro-reflections can be orders of magnitude stronger than reflections from the target objects. Retro-reflections can be especially detrimental to some lidar detections that use phase modulation techniques.

Aspects and implementations of the present disclosure enable methods and systems that suppress (e.g., eliminate or reduce significantly) retro-reflections and facilitate more efficient detection of target-reflected beams. More specifically, a lidar device can generate a phase-controlled beam (or multiple beams) that interferes destructively with the retro-reflected light before the received beam is analyzed with photodetectors. In one example, the phase-controlled beam can be a copy of the transmitted beam that is further processed by an amplitude changer and a phase shifter. The settings of the amplitude changer and the phase shifter can be controlled based on the output of the photodetectors so that the amplitude $A_{PC}$ of the phase-controlled beam is close to the amplitude of the retro-reflected light $A_{RR}$, $A_{PC} \approx A_{RR}$, and the phase difference between the phase $\phi_{PC}$ of the phase-controlled beam and the phase $\phi_{RR}$ of the retro-reflected light is close to half a period: $\phi_{PC}-\phi_{RR} \approx \pi$ (modulo $2\pi$).

In another example, the lidar device can output two (or more) transmitted beams using two different (though similar) optical interfaces, e.g., along two different spatial directions (channels). Two retro-reflected lights in the two channels can be similar in amplitude (if the two channels deploy similar optical elements) whereas their phase difference can be controlled by passing at least one of the received beams through a phase shifter. The two beams received via the two channels can then be combined together. The settings of the phase shifter can be controlled to ensure that the retro-reflections in the two channels interfere destructively. This eliminates the retro-reflections in both channels simultaneously. The settings can be controlled dynamically at runtime or statically at the time of manufacturing and/or during calibration, or both statically and dynamically. Numerous other implementations are disclosed herein.

The advantages of the disclosed implementations include, but are not limited to, suppressing spurious retro-reflections, improving efficiency and accuracy of lidar speed and velocity detections. This, in turn, improves safety of lidar-based applications, such as autonomous vehicle driving missions.

FIG. 1 is a diagram illustrating components of an example autonomous vehicle (AV) 100 that can deploy a lidar device capable of suppression of retro-reflections for improved efficiency, accuracy, and speed of target characterization, in accordance with some implementations of the present disclosure. Autonomous vehicles can include motor vehicles (cars, trucks, buses, motorcycles, all-terrain vehicles, recreational vehicle, any specialized farming or construction vehicles, and the like), aircraft (planes, helicopters, drones, and the like), naval vehicles (ships, boats, yachts, submarines, and the like), or any other self-propelled vehicles (e.g., robots, factory or warehouse robotic vehicles, and sidewalk delivery robotic vehicles) capable of being operated in a self-driving mode (without a human input or with a reduced human input).

Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

As described herein, in a semi or partially autonomous driving mode, even though the vehicle assists with one or more driving operations (e.g., steering, braking and/or accelerating to perform lane centering, adaptive cruise control, advanced driver assistance systems (ADAS), and emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, similar techniques can be used in various driver assistance systems that do not rise to the level of fully autonomous driving systems. In the United States, the Society of Automotive Engineers (SAE) have defined different levels of automated driving operations to indicate how much, or how little, a vehicle controls the driving, although different organizations, in the United States or in other countries, may categorize the levels differently. More specifically, disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway) conditions. Likewise, the disclosed systems and methods can be used in vehicles that use SAE Level 4 self-driving systems that operate autonomously under most regular driving situations and require only occasional attention of the human operator. In all such driving assistance systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

A driving environment 110 can be or include any portion of the outside environment containing objects that can determine or affect how driving of the AV occurs. More specifically, a driving environment 110 can include any objects (moving or stationary) located outside the AV, such as roadways, buildings, trees, bushes, sidewalks, bridges, mountains, other vehicles, pedestrians, bicyclists, and so on. The driving environment 110 can be urban, suburban, rural, and so on. In some implementations, the driving environment 110 can be an off-road environment (e.g. farming or agricultural land). In some implementations, the driving environment can be inside a structure, such as the environment of an industrial plant, a shipping warehouse, a hazardous area of a building, and so on. In some implementations, the driving environment 110 can consist mostly of objects moving parallel to a surface (e.g., parallel to the surface of Earth). In other implementations, the driving environment can include objects that are capable of moving partially or fully perpendicular to the surface (e.g., balloons, and leaves falling). The term "driving environment" should be understood to include all environments in which motion of self-propelled vehicles can occur. For example, "driving environment" can include any possible flying environment of an aircraft or a marine environment of a naval vessel. The objects of the driving environment 110 can be located at any distance from the AV, from close distances of several feet (or less) to several miles (or more).

The example AV 100 can include a sensing system 120. The sensing system 120 can include various electromagnetic (e.g., optical) and non-electromagnetic (e.g., acoustic) sensing subsystems and/or devices. The terms "optical" and "light," as referenced throughout this disclosure, are to be understood to encompass any electromagnetic radiation (waves) that can be used in object sensing to facilitate autonomous driving, e.g., distance sensing, velocity sensing, acceleration sensing, rotational motion sensing, and so on. For example, "optical" sensing can utilize a range of light visible to a human eye (e.g., the 380 to 700 nm wavelength range), the UV range (below 380 nm), the infrared range (above 700 nm), the radio frequency range (above 1 m), etc. In implementations, "optical" and "light" can include any other suitable range of the electromagnetic spectrum.

The sensing system 120 can include a radar unit 126, which can be any system that utilizes radio or microwave frequency signals to sense objects within the driving environment 110 of the AV 100. Radar unit 126 may deploy a sensing technology that is similar to the lidar technology but uses a radio wave spectrum of the electromagnetic waves. For example, radar unit 126 may use 10-100 GHz carrier radio frequencies. Radar unit 126 may be a pulsed ToF radar, which detects a distance to the objects from the time of signal propagation, or a continuously-operated coherent radar, which detects both the distance to the objects as well as the velocities of the objects, by determining a phase difference between transmitted and reflected radio signals. Compared with lidars, radar sensing units have lower spatial resolution (by virtue of a much longer wavelength), but lack expensive optical elements, are easier to maintain, have a longer working range, and are less sensitive to adverse weather conditions. An AV may often be outfitted with multiple radar transmitters and receivers as part of the radar unit 126. The radar unit 126 can be configured to sense both the spatial locations of the objects (including their spatial dimensions) and their velocities (e.g., using the radar Doppler shift technology). The sensing system 120 can include a lidar sensor 122 (e.g., a lidar rangefinder), which can be a laser-based unit capable of determining distances to the objects in the driving environment 110 as well as, in some implementations, velocities of such objects. The lidar sensor 122 can utilize wavelengths of electromagnetic waves that are shorter than the wavelength of the radio waves and can thus provide a higher spatial resolution and sensitivity compared with the radar unit 126. The lidar sensor 122 can include a ToF lidar and/or a coherent lidar sensor, such as a frequency-modulated continuous-wave (FMCW) lidar sensor, phase-modulated lidar sensor, amplitude-modulated lidar sensor, and the like. Coherent lidar sensor can use optical heterodyne detection for velocity determination. In some implementations, the functionality of the ToF lidar sensor and coherent lidar sensor can be combined into a single (e.g., hybrid) unit capable of determining both the distance to and the radial velocity of the reflecting object. Such a hybrid unit can be configured to operate in an incoherent sensing mode (ToF mode) and/or a coherent sensing mode (e.g., a mode that uses heterodyne detection) or both modes at the same time. In some implementations, multiple lidar sensor units can be mounted on an AV, e.g., at different locations separated in space, to provide additional information about a transverse component of the velocity of the reflecting object.

Lidar sensor 122 can include one or more laser sources producing and emitting signals and one or more detectors of the signals reflected back from the objects. Lidar sensor 122 can include spectral filters to filter out spurious electromagnetic waves having wavelengths (frequencies) that are different from the wavelengths (frequencies) of the emitted signals. In some implementations, lidar sensor 122 can include directional filters (e.g., apertures, diffraction gratings, and so on) to filter out electromagnetic waves that can arrive at the detectors along directions different from the reflection directions for the emitted signals. Lidar sensor 122 can use various other optical components (lenses, mirrors, gratings, optical films, interferometers, spectrometers, local oscillators, and the like) to enhance sensing capabilities of the sensors.

In some implementations, lidar sensor 122 can include one or more 360-degree scanning units (which scan the outside environment in a horizontal direction, in one example). In some implementations, lidar sensor 122 can be capable of spatial scanning along both the horizontal and vertical directions. In some implementations, the field of view can be up to 90 degrees in the vertical direction (e.g., with at least a part of the region above the horizon scanned by the lidar signals or with at least part of the region below the horizon scanned by the lidar signals). In some implementations (e.g., in aeronautical environments), the field of view can be a full sphere (consisting of two hemispheres). For brevity and conciseness, when a reference to "lidar technology," "lidar sensing," "lidar data," and "lidar," in general, is made in the present disclosure, such reference shall be understood also to encompass other sensing technology that operate, generally, at the near-infrared wavelength, but can include sensing technology that operate at other wavelengths as well.

Lidar sensor 122 can include a retro-reflection suppression function (RRS) 124, which can use a combination of hardware elements and software components capable of interference-based suppression of retro-reflections for improved efficiency of lidar sensing. RRS 124 can deploy a variety of techniques, as described below in conjunction with FIGS. 2-5. For example, RRS 124 can include electronic circuitry and optical elements that generate additional light beams interfering destructively with retro-reflected light and, therefore, significantly reducing the intensity of the retro-reflected light. The optical elements of RRS 124 can include beam splitters, which can be used to generate copies of a transmitted beam. The optical elements of RRS 124 can further include amplitude changers and phase shifters, e.g., to modify the generated copy of the transmitted beam. The optical elements of RRS 124 can further include optical couplers or optical circulators, e.g., to combine the phase-controlled copy (or multiple copies) of TX beams with received (RX) beams to take advantage of destructive interference that suppresses the retro-reflected light. The electronic circuitry of RRS 124 can include coherent photodetectors to determine phase information of the reflected beams. In some implementations, the reflected beams can be first combined with phase-controlled beams before being input into coherent photodetectors together with local oscillator copies of the transmitted beams.

The electronic circuitry of RRS 124 can include radio frequency processing, e.g., to process frequency and/or phase modulation of the transmitted and received beams. The electronic circuitry of RRS 124 can further include digital signal processing, which can dynamically analyze retro-reflection suppression as a function of the parameters (e.g., amplitude and phase) of the phase-controlled signal(s) and can adjust the characteristics (e.g., phase and amplitude) of such signal(s) until retro-reflected light is maximally suppressed. Additional elements of RRS 124 and various combinations of such elements are further illustrated in conjunction with FIGS. 2-5 below.

The sensing system 120 can further include one or more cameras 129 to capture images of the driving environment 110. The images can be two-dimensional projections of the driving environment 110 (or parts of the driving environment 110) onto a projecting plane of the cameras (flat or non-flat, e.g. fisheye cameras). Some of the cameras 129 of the sensing system 120 can be video cameras configured to capture a continuous (or quasi-continuous) stream of images of the driving environment 110. Some of the cameras 129 of the sensing system 120 can be high resolution cameras (RRCs) and some of the cameras 129 can be surround view cameras (SVCs). The sensing system 120 can also include one or more sonars 128, which can be ultrasonic sonars, in some implementations.

The sensing data obtained by the sensing system 120 can be processed by a data processing system 130 of AV 100. In some implementations, the data processing system 130 can include a perception system 132. Perception system 132 can be configured to detect and track objects in the driving environment 110 and to recognize/identify the detected objects. For example, the perception system 132 can analyze images captured by the cameras 129 and can be capable of detecting traffic light signals, road signs, roadway layouts (e.g., boundaries of traffic lanes, topologies of intersections, designations of parking places, and so on), presence of obstacles, and the like. The perception system 132 can further receive the lidar sensing data (Doppler data and/or ToF data) to determine distances to various objects in the driving environment 110 and velocities (radial and transverse) of such objects. In some implementations, the perception system 132 can also receive the radar sensing data, which may similarly include distances to various objects as well as velocities of those objects. Radar data can be complementary to lidar data, e.g., whereas lidar data may high-resolution data for low and mid-range distances (e.g., up to several hundred meters), radar data may include lower-resolution data collected from longer distances (e.g., up to several kilometers or more). In some implementations, perception system 132 can use the lidar data and/or radar data in combination with the data captured by the camera(s) 129. In one example, the camera(s) 129 can detect an image of road debris partially obstructing a traffic lane. Using the data from the camera(s) 129, perception system 132 can be capable of determining the angular extent of the debris. Using the lidar data, the perception system 132 can determine the distance from the debris to the AV and, therefore, by combining the distance information with the angular size of the debris, the perception system 132 can determine the linear dimensions of the debris as well.

In another implementation, using the lidar data, the perception system 132 can determine how far a detected object is from the AV and can further determine the component of the object's velocity along the direction of the AV's motion. Furthermore, using a series of quick images obtained by the camera, the perception system 132 can also determine the lateral velocity of the detected object in a direction perpendicular to the direction of the AV's motion. In some implementations, the lateral velocity can be determined from the lidar data alone, for example, by recognizing an edge of the object (using horizontal scanning) and further determining how quickly the edge of the object is moving in the lateral direction. The perception system 132 can receive one or more sensor data frames from the sensing system 120. Each of the sensor frames can include multiple points. Each point can correspond to a reflecting surface from which a signal emitted by the sensing system 120 (e.g., lidar sensor 122) is reflected. The type and/or nature of the reflecting surface can be unknown. Each point can be associated with various data, such as a timestamp of the frame, coordinates of the reflecting surface, radial velocity of the reflecting surface, intensity of the reflected signal, and so on.

The perception system 132 can further receive information from a positioning subsystem, which can include a GPS transceiver (not shown), configured to obtain information about the position of the AV relative to Earth and its surroundings. The GNSS (or other positioning) data processing module 134 can use the positioning data (e.g., GNSS, GPS, and IMU data) in conjunction with the sensing data to help accurately determine the location of the AV with respect to fixed objects of the driving environment 110 (e.g. roadways, lane boundaries, intersections, sidewalks, crosswalks, road signs, curbs, and surrounding buildings) whose locations can be provided by map information 135. In some implementations, the data processing system 130 can receive non-electromagnetic data, such as audio data (e.g., ultrasonic sensor data, or data from a mic picking up emergency vehicle sirens), temperature sensor data, humidity sensor data, pressure sensor data, meteorological data (e.g., wind speed and direction, precipitation data), and the like.

Data processing system 130 can further include an environment monitoring and prediction component 136, which can monitor how the driving environment 110 evolves with time, e.g., by keeping track of the locations and velocities of the moving objects. In some implementations, environment monitoring and prediction component 136 can keep track of the changing appearance of the driving environment due to motion of the AV relative to the environment. In some implementations, driving environment monitoring and prediction component 136 can make predictions about how various moving objects of the driving environment 110 will be positioned within a prediction time horizon. The predictions can be based on the current locations and velocities of the moving objects as well as on the tracked dynamics of the moving objects during a certain (e.g., predetermined) period of time. For example, based on stored data for object 1 indicating accelerated motion of object 1 during the previous 3-second period of time, environment monitoring and prediction component 136 can conclude that object 1 is resuming its motion from a stop sign or a red traffic light signal. Accordingly, environment monitoring and prediction component 136 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, environment monitoring and prediction component 136 can conclude that object 2 is stopping at a stop sign or at a red traffic light signal. Accordingly, environment monitoring and prediction component 136 can predict where object 2 is likely to be within the next 1 or 3 seconds. Environment monitoring and prediction component 136 can perform periodic checks of the accuracy of its predictions and modify the predictions based on new data obtained from the sensing system 120.

The data generated by the perception system 132, the GNSS data processing module 134, and environment monitoring and prediction component 136 can be used by an autonomous driving system, such as AV control system (AVCS) 140. The AVCS 140 can include one or more algorithms that control how AV 100 is to behave in various driving situations and driving environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size, shape, and trajectories of the obstacles (if obstacles are moving) and select an optimal driving strategy (e.g., braking, steering, and accelerating) for avoiding the obstacles.

Algorithms and modules of AVCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, etc.), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions outputted by the AVCS 140 can be delivered directly to the powertrain, brakes, and steering 150 (or signaling 170) whereas other instructions outputted by the AVCS 140 are first delivered to the vehicle electronics 160, which generate commands to the powertrain and steering 150 and/or signaling 170.

In one example, the AVCS 140 can determine that an obstacle identified by the data processing system 130 is to be avoided by decelerating the vehicle until a safe speed is reached, followed by steering the vehicle around the obstacle. The AVCS 140 can output instructions to the powertrain, brakes, and steering 150 (directly or via the vehicle electronics 160) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain, brakes, and steering 150 to resume the previous speed settings of the vehicle.

Figure 2:
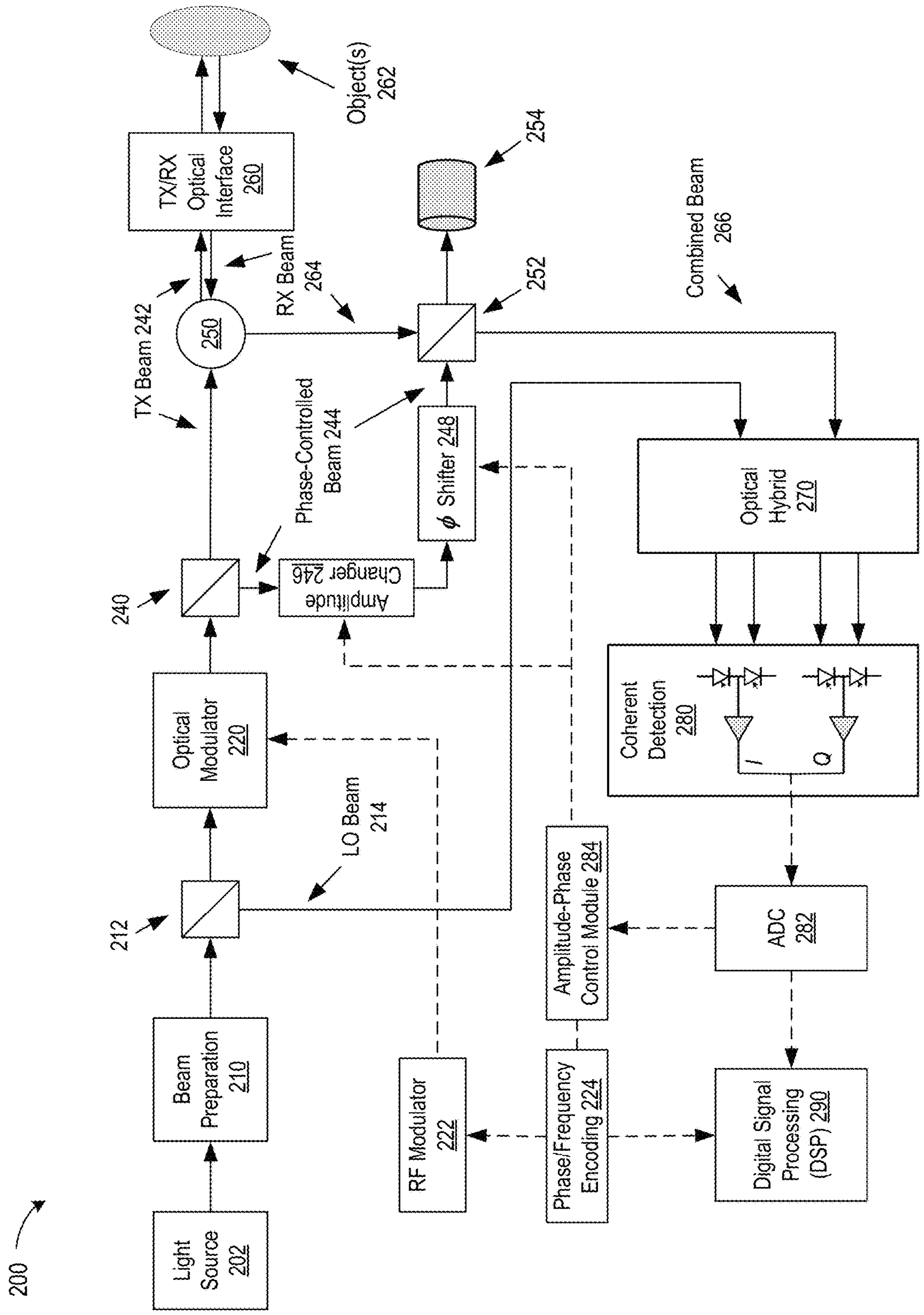
FIG. 2 is a block diagram illustrating an example implementation of an optical sensing system capable of suppression of retro-reflected light, in accordance with some implementations of the present disclosure.

FIG. 2 is a block diagram illustrating an example implementation of an optical sensing system 200 capable of suppression of retro-reflected light, in accordance with some implementations of the present disclosure. Sensing system 200 can be a part of lidar sensor 122 that includes RRS 124. Depicted in FIG. 2 is a light source 202 configured to produce one or more beams of light. "Beams" should be understood herein as referring to any signals of electromagnetic radiation, such as beams, wave packets, pulses, sequences of pulses, or other types of signals. Solid arrows in FIG. 2 (and other figures) indicate optical signal propagation whereas dashed arrows depict propagation of electrical (e.g., RF or other analog) signals or electronic (e.g., digital) signals. Light source 202 can be a broadband laser, a narrow-band laser, a light-emitting diode, and the like. Light source 202 can be a semiconductor laser, a gas laser, an ND:YAG laser, or any other type of a laser. Light source 202 can be a continuous wave laser, a single-pulse laser, a repetitively pulsed laser, a mode locked laser, and the like.

In some implementations, light outputted by light source 202 can be conditioned (pre-processed) by one or more components or elements of a beam preparation stage 210 of the optical sensing system 200 to ensure a narrow-band spectrum, target linewidth, coherence, polarization (e.g., circular or linear), and other optical properties that enable coherent (e.g., Doppler) measurements described below. Beam preparation can be performed using filters (e.g., narrow-band filters), resonators (e.g., resonator cavities, and crystal resonators), polarizers, feedback loops, lenses, mirrors, diffraction optical elements, and other optical devices. For example, if light source 202 is a broadband light source, the output light can be filtered to produce a narrowband beam. In some implementations, in which light source 202 produces light that has a desired linewidth and coherence, the light can still be additionally filtered, focused, collimated, diffracted, amplified, polarized, etc., to produce one or more beams of a desired spatial profile, spectrum, duration, frequency, polarization, repetition rate, and so on. In some implementations, light source 202 can produce (alone or in combination with beam preparation stage 210) a narrow-linewidth light with a linewidth below 100 KHz.

After the light beam is configured by beam preparation stage 210, the light beam can undergo spatial separation at a beam splitter 212, which produces a local oscillator (LO) beam 214. The LO beam 214 can be a copy of (though of a different amplitude than) the beam outputted by beam preparation stage 210 and can be used as a reference signal to which a signal reflected from a target object is compared. The beam splitter 212 can be a prism-based beam splitter, a partially-reflecting mirror, a polarizing beam splitter, a beam sampler, a fiber optical coupler (optical fiber adaptor), or any similar beam splitting element (or a combination of two or more beam-splitting elements). The beam splitter can be a 90:10 or 80:20 beam splitter with the LO beam 214 carrying a small portion of the total energy of the generated light beam. The light beam can be delivered to the beam splitter 212 (as well as between any other optical components depicted in FIG. 2 (or other figures) over air or over any suitable light carriers, such as optical fibers and/or waveguides.

An optical modulator 220 can impart optical modulation to a second light beam outputted by the beam splitter 212. "Optical modulation" is to be understood herein as referring to any form of angle modulation, such as phase modulation (e.g., any sequence of phase changes $\Delta\phi(t)$ as a function of time t that are added to the phase of the beam), frequency modulation (e.g., any sequence of frequency changes $\Delta f(t)$ as a function of time t), or any other type of modulation (including a combination of a phase and a frequency modulation) that affects the phase of the wave. Optical modulation is also to be understood to include, where applicable, amplitude modulation $\Delta A(t)$ as a function of time t Amplitude modulation can be applied to light in combination with angle modulation or separately, without angle modulation.

In some implementations, optical modulator 220 can impart angle modulation to the second light beam using one or more RF circuits, such as RF modulator 222, which can include one or more RF local oscillators, mixers, amplifiers, filters, and the like. Even though, for brevity and conciseness, modulation is referred to herein as being performed with RF signals, it should be understood that other frequencies can also be used for angle modulation, including but not limited to Terahertz frequencies, microwave frequencies, and so on. RF modulator 222 can impart optical modulation in accordance with a programmed modulation scheme, e.g., encoded in a sequence of control signals provided by a phase/frequency encoding module (herein also referred to, for simplicity, as encoding module) 224. The control signals can be in an analog format or a digital format. In the latter instances, RF modulator 222 can further include a digital-to-analog convertor (DAC) to transform digital control signals to analog form. The encoding module 224 can implement any suitable encoding (keying), e.g., linear frequency chirps (e.g., a chirp-up/chirp-down sequence), pseudorandom keying sequence of phase $\Delta\phi$ or frequency $\Delta f$ shifts, and the like. The encoding module 224 can provide the encoding data to RF modulator 222 that can convert the provided data to RF electrical signals and apply the RF electrical signals to optical modulator 220 that modulates the light beam.

In some implementations, optical modulator 220 can include an acousto-optic modulator (AOM), an electro-optic modulator (EOM), a Lithium Niobate modulator, a heat-driven modulator, a Mach-Zehnder modulator, and the like, or any combination thereof. In some implementations, optical modulator 220 can include a quadrature amplitude modulator (QAM) or an in-phase/quadrature modulator (IQM). Optical modulator 220 can include multiple AOMs, EOMs, IQMs, one or more beam splitters, phase shifters, combiners, and the like. For example, optical modulator 220 can split an incoming light beam into two beams, modify a phase of one of the split beams (e.g., by a 90-degree phase shift), and pass each of the two split beams through a separate optical modulator to apply angle modulation to each of the two beams using a target encoding scheme. The two beams can then be combined into a single beam. In some implementations, angle modulation can add phase/frequency shifts that are continuous functions of time. In some implementations, added phase/frequency shifts can be discrete and can take on a number of values, e.g., N discrete values across the phase interval $2\pi$ (or across a frequency band of a predefined width). Optical modulator 220 can add a predetermined time sequence of the phase/frequency shifts to the light beam. In some implementations, a modulated RF signal can cause optical modulator 220 to impart to the light beam a sequence of frequency up-chirps interspersed with down-chirps. In some implementations, phase/frequency modulation can have a duration between a microsecond and tens of microseconds and can be repeated with a repetition rate ranging from one or several kilohertz to hundreds of kilohertz. Any suitable amplifier (not shown in FIG. 2 for conciseness) can amplify the modulated light beam.

Beam splitter 240 can split the modulated beam into a beam to be transmitted into an outside environment, e.g., a TX beam 242, and a phase-controlled beam 244 to be used internally for retro-reflection suppression. TX beam 242 can be transmitted through an optical circulator 250 and an optical interface 260 towards one or more objects 262 in the outside environment. Optical interface 260 can include one or more optical elements, e.g., apertures, lenses, mirrors, collimators, polarizers, waveguides, optical switches, optical phased arrays, and the like, or any such combination of optical elements. Optical interface 260 can include a transmission (TX) interface and a separate receiving (RX) interface. In some implementations, some of the optical elements (e.g., lenses, mirrors, collimators, optical fibers, waveguides, optical switches, optical phased arrays, beam splitters, and the like) can be shared by the TX interface and the RX interface. As shown in FIG. 2, in a combined TX/RX optical interface 260, the transmitted beam and the received (RX) beam 264 can follow the same (at least partially) optical paths. TX beam 242 and RX beam 264 can be separated by optical circulator 250, which can be a Faraday effect-based device, a birefringent crystal-based device, or any other suitable device. RX beam 264 can be a combination of a light reflected from object 262 and a light retro-reflected from various optical components of the optical interface 260 (e.g., lenses, gratings, couplers, and junctions). A stray TX light entering the downward port of the optical circulator 250 can also contribute to the retro-reflected light. The optical circulator 250 can direct the received beam towards a beam splitter 252 (or any suitable beam combiner) to combine RX beam 264 with the phase-controlled beam 244.

The phase-controlled beam 244 can be prepared using an amplitude changer 246 and a phase shifter 248. Amplitude changer 246 can be a combination of optical elements, including optical amplifiers, interferometers, absorbers, beam splitters, combiners, and/or other elements. In some implementations, to control the amplitude of phase-controller beam 244, the beam (of angular frequency $\omega$)

$$A_0e^{i\omega(x/c-t)}$$

can first pass through a saturation amplifier so that the amplitude is increased to a known fixed value. The beam can then be split into two (or more) component beams, e.g., with each component beam carrying an equal portion of the beam's power, e.g., two $$A_0e^{i\omega(x/c-t)}/2$$

beams. A phase of at least one component beam can be modified in a controlled way before the two (or more) components, e.g., $$A_0e^{i\omega(x/c-t)}/2 \text{ and } A_0e^{i\omega(x/c-t)+\alpha}/2$$

are recombined. The intensity of the recombined beam can thus be, $$|A_0 + A_0e^{\alpha}|^2/4 = I_0(\alpha/2),$$

where $I_0=|A_0|^2$ is the intensity of the original beam. By changing the phase shift $\alpha$ between 0 and $\pi$, the recombined beam intensity can be varied between $I_0$ and 0. The phase shift $\alpha$ can be controlled, e.g., by directing the corresponding component beam through a longer path or through a material with a controlled (e.g., electrically controlled) refractive index, e.g., a doped Si or other semiconducting material. The amplifier(s) can be active gain medium amplifiers, e.g., doped-fiber amplifiers, solid-state amplifiers (including semiconductor optical amplifiers), parametric amplifiers, and the like, or some combination thereof.

The phase of the (recombined) phase-controlled beam 244 can be controlled by a phase shifter 248, which can operate similarly as the described phase shifter of amplitude changer 246. Phase shifter 248 can control the overall phase of the phase-controlled beam 244, with a phase change caused by the phase shifter added to the phase change caused by amplitude changer 246.

The phase-controlled beam 244 may be combined with RX beam 264 by a beam splitter 252 into a combined beam 266. In some implementations, beam splitter 252 can operate predominantly as a transmitter (e.g., with the transmission/reflection ratio of 80:20 or 90:10) sending most of the intensity of the phase-controlled beam into a light stop (e.g., dump, and absorber) 254. This ensures that the portion of phase-controlled beam 244 in combined beam 266 does not overwhelm the portion contributed by RX beam 264, while the loss of RX beam 264 is minimized. In some implementations, the amplitude of the phase-controlled beam 244 can be kept low (e.g., of the order of RX beam 264), so that beam splitter 252 can be replaced with a beam combiner without the use of light stop 254.

The combined beam 266 can be input into optical hybrid stage 270 whose second input can be LO beam 214. Optical hybrid stage 270 can perform pre-conditioning of the input beams prior to processing by a coherent detection stage 280. In some implementations, optical hybrid stage 270 can be a 180-degree hybrid stage capable of detecting the absolute value of a phase difference of the input beams. In some implementations, optical hybrid stage 270 can be a 90-degree optical hybrid stage capable of detecting both the absolute value and a sign of the phase difference of the input beams. For example, in the latter case, optical hybrid stage 270 can be designed to split each of the input beams into multiple copies (e.g., four copies, as depicted). Optical hybrid stage 270 can apply controlled phase shifts (e.g., 90°, 180°, 270°) to some of the copies, e.g., copies of LO 214, and mix the phase-shifted copies of LO 214 with other input beams, e.g., copies of the combined beam 266, whose electric field is denoted with $E_{CB}$. As a result, the optical hybrid stage 270 can produce the in-phase symmetric and anti-symmetric combinations $(E_{CB}+E_{LO})/2$ and $(E_{CB}-E_{LO})/2$ of the input beams, and the quadrature 90-degree-shifted combinations $(E_{CB}+iE_{LO})/2$ and $(E_{CB}-iE_{LO})/2$ of the input beams (i being the imaginary unit number).

The coherent detection stage 280 receives four input combinations of $E_{CB}$ and $E_{LO}$ (in case of a 90-degree optical hybrid stage 270) or two combinations $E_{CB}\pm E_{LO}$ (in case of a 180-degree optical hybrid stage 270). The coherent detection stage 280 then processes the received inputs using one or more coherent light analyzers, such as balanced photodetectors, to detect phase information carried by RX beam 264 and combined beam 266. A balanced photodetector can have photodiodes connected in series and can generate AC electrical signals that are proportional to a difference of intensities of the input optical modes (which can also be pre-amplified). A balanced photodetector can include photodiodes that are Si-based, InGaAs-based, Ge-based, Si-on-Ge-based, and the like (e.g. avalanche photodiode). In some implementations, balanced photodetectors can be manufactured on a single chip, e.g., using complementary metal-oxide-semiconductor (CMOS) structures, silicon photomultiplier (SiPM) devices, or similar systems. In the implementation depicted in FIG. 2, the LO beam 214 is unmodulated, but it should be understood that in other implementations consistent with the present disclosure, LO beam 214 can be modulated. For example, optical modulator 220 can be positioned between beam preparation stage 210 and beam splitter 212 to modulate LO beam 214.

Each of the input signals can then be received by respective photodiodes connected in series. An in-phase electric current I can be produced by a first pair of the photodiodes and a quadrature current Q can be produced by a second pair of photodiodes. Each of the currents can be further processed by one or more operational amplifiers, intermediate frequency amplifiers, and the like. The in-phase I and quadrature Q currents can then be mixed into a complex photocurrent whose AC part $$J = \left|\frac{E_{CB}+E_{LO}}{2}\right|^2 - \left|\frac{E_{CB}-E_{LO}}{2}\right|^2 + \left|\frac{E_{CB}+iE_{LO}}{2}\right|^2 - \left|\frac{E_{CB}+iE_{LO}}{2}\right|^2 = E_{CB}E_{LO}^*$$

is sensitive to both the absolute value and the sign of the phase difference of $E_{CB}$ and $E_{LO}$. Similarly, an 180-degree optical hybrid can produce only the in-phase photocurrent whose AC part $$J = \left|\frac{E_{CB}+E_{LO}}{2}\right|^2 - \left|\frac{E_{CB}-E_{LO}}{2}\right|^2 = ReE_{CB}E_{LO}^*$$

is sensitive to the absolute value of the phase difference but not the sign of this phase difference.

The photocurrent J can be digitized by analog-to-digital circuitry (ADC) 282 to produce a digitized electrical signal that can then be provided to digital signal processing (DSP) 290. The electric field of the combined beam can be a sum of three contributions: $E_{CB}=E_{Ref}+E_{RR}+E_{PC}$, e.g., the reflected beam $E_{Ref}$ carrying information about object 262, the spurious retro-reflected beam $E_{RR}$ (the sum $E_{Ref}+E_{RR}$ represent the RX beam 264), and the phase-controlled beam $E_{PC}$ whose characteristics, e.g., amplitude $A_{PC}$ and phase $\phi_{PC}$, can be controlled to minimize the combination $E_{RR}+E_{PC}$. In some implementations, an amplitude-phase control module 284 can be used to execute a feedback loop and optimize amplitude $A_{PC}$ and phase $\phi_{PC}$ to achieve suppression of retro-reflected light.

On one hand, retro-reflected light is typically much stronger than the reflected beam, $|E_{RR}|>>E_{Ref}$. On the other hand, the retro-reflected light, the LO beam, and the phase controlled beam are internal to the lidar system and have time delays $\tau$ that are significantly lower (e.g., negligible) than the time delays $\tau=2L/c$ experienced by the reflected beam $E_{Ref}$. In sensing systems that use frequency-modulated beams, the contribution $J_{\blacksquare}=[E_{RR}(t)+E_{PC}(t)]E^*_{LO}(t)$ can show up as a strong peak concentrated in or near the DC domain. The amplitude-phase control module 284 can perform scanning in the two-dimensional amplitude-phase space $A_{PC}$, $\phi_{PC}$ to minimize the DC contribution $J_{dc}$ until maximal suppression of $J_{dc}$ is achieved. Subsequently, amplitude-phase control module 284 can maintain the determined amplitude $A_{PC}$ and phase $\phi_{PC}$ for a certain time, e.g., for a predetermined time or until (whichever happens first) environmental conditions, e.g., temperature of the lidar device, atmospheric pressure, and humidity, are changed by a certain amount, such as above a certain threshold percentage, 2%, 3%, etc. Responsive to the passage of the predetermined time or changed conditions, amplitude-phase control module 284 can re-determine the amplitude $A_{PC}$ and phase $\phi_{PC}$ that minimize $J_{dc}$. In sensing systems that use phase-modulated beams, a correlation function of phase shifts in the reflected beam and phase shifts imparted to the TX beam may be analyzed and a peak corresponding to zero distance reflections may be identified. Correspondingly, amplitude-phase control module 284 can identify the amplitude $A_{PC}$ and phase $\phi_{PC}$ that minimize the magnitude of the zero distance peak.

The remaining digitized signal $$J_{ref}(t)=E_{ref}(t)E^{*}_{LO}(t)$$

is representative of a beating pattern between the LO beam 214 and the beam reflected from object 262. More specifically, the reflected beam $E_{Ref}(t)$ received by the optical sensing system 200 at time t was transmitted to the target at time $t-\tau$, where $\tau=2L/c$ (the delay time) is the time of photon travel to the target located at distance L and back. DSP 290 can correlate the phase modulation in the digitized signal $J_{ref}(t)$ with the phase and/or frequency encoding (the encoding scheme can be obtained from encoding module 224) and determine the time of flight $\tau$ based on the time offset that ensures the optimal match between the two modulations. The distance to object 262 is then determined as $L=c\tau/2$. The radial velocity of object 262 can be determined based on the Doppler shift $f_D$ of the carrying frequency $f+f_D$ of the reflected beam compared with the frequency f of LO beam 214: $V=cf_D/(2f)$, Amplitude-phase control module 284 and DSP 290 can include spectral analyzers, such as Fast Fourier Transform (FTT) analyzers, cross-correlators, and other circuits configured to process digital signals, including central processing units (CPUs), graphic processing units (GPUs), field-programmable gate arrays (FPGAs), application-specific integrated circuits (ASICs), etc., and memory devices. In some implementations, the processing and memory circuits can be implemented as part of a microcontroller. Although shown as two separate modules in FIG. 2, for the ease of illustration, in some implementations, amplitude-phase control module 284 and DSP 290 can be implemented as a single module.

Multiple variations of the optical sensing system 200 are within the scope of the present disclosure. For example, if optical hybrid stage 270 is a 180-degree optical hybrid, the in-phase electrical signal generated by coherent detection stage 280 can be agnostic about the sign of $f_D$ as Doppler-shifted beams with frequencies $f+f_D$ and $f-f_D$ result in the same in-phase signals. To eliminate the symmetry between the positive and negative Doppler shifts, a frequency offset $f_{off}$ can be imparted to the TX beam 242 and the phase-controlled beam 244 (or, alternatively, to LO beam 214). This disambiguates reflections from objects moving with opposite velocities +V and −V by causing the beatings between $E_{Ref}(t)$ and $E_{LO}(t)$ to occur with frequencies $f_{off}-f_D$ and $f_{off}+f_D$, having different absolute values. The offset frequency $f_{off}$ can be applied to the TX beam 242 and the phase-controlled beam 244 (or LO beam 214) by an optical modulator 220 and/or additional optical modulator not shown in FIG. 2.

Figure 3:
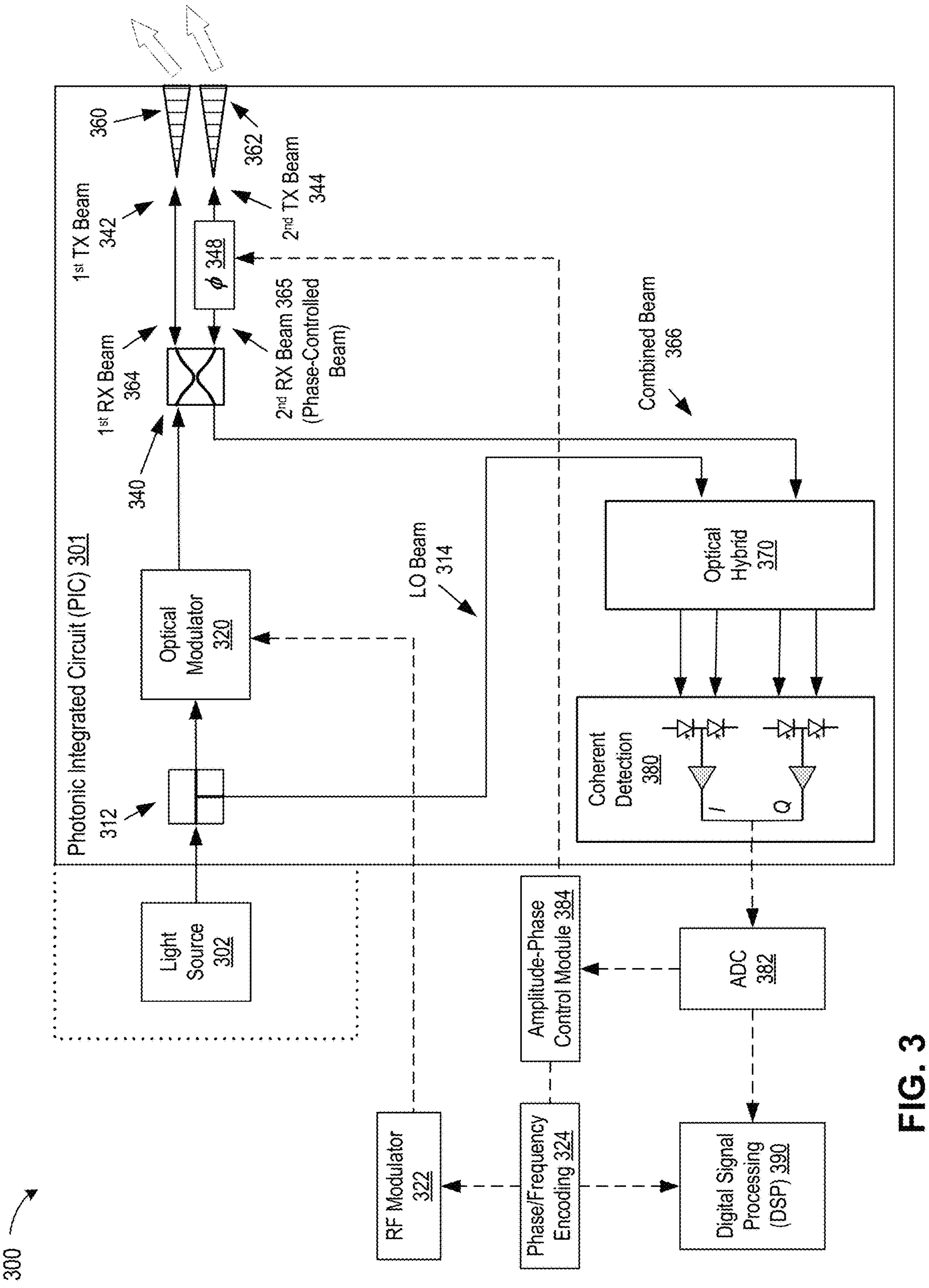
FIG. 3 is a block diagram illustrating an example implementation of an optical sensing system capable of suppression of retro-reflected light by controlling a relative phase of multiple received beams, in accordance with some implementations of the present disclosure.

FIG. 3 is a block diagram illustrating an example implementation of an optical sensing system 300 capable of suppression of retro-reflected light by controlling a relative phase of multiple received beams, in accordance with some implementations of the present disclosure. Various components of optical sensing system 300 that are similar to the corresponding components of sensing system 200 can be implemented similarly, unless indicated otherwise. The optical sensing system 300 is depicted as deploying a photonic integrated circuit (PIC) 301 for at least a part of optical beam processing, but similar techniques can be used in systems that use optical fibers for transporting light between various optical elements or systems that use free space light delivery.

A light source 302 can produce a beam of light, which can be further conditioned and preprocessed by a beam preparation stage (not shown for brevity), e.g., as described above in conjunction with FIG. 2. In some implementations, the light can be delivered, e.g., via optical fiber or free space, to PIC 301 for further processing. In some implementations, as depicted with the dotted line, light source 302 can be a light source (e.g., semiconducting laser, and laser diode) that is integrated on PIC 301. PIC 301 can perform multiple passive and active optical functions to create one or more signals with desired amplitude, phase, spectral, and polarization characteristics. PIC 301 can include a number of waveguides, beam splitters, couplers, light switches, phase shifters, optical amplifiers, diffraction gratings, grating couplers, photodiodes, and other optical elements. A beam produced by light source 302 can be received by PIC 301 using one or more directional switches that direct the incoming light within a plane of a chip to a beam splitter 312, e.g., over a Si single-mode or multi-mode waveguide(s). Beam splitter 312 can be a one-to-two power splitter, or any other suitable splitter. Beam splitter 312 can produce an LO beam 314 that is to be used as a reference signal. LO beam 314 can carry a small portion of the light power incident on beam splitter 312 with the remaining light delivered to optical modulator 320 that imparts optical modulation, including phase modulation, frequency modulation, amplitude modulation, or any combination thereof. The modulation can be caused by electrical signals provided by RF modulator 322 that implements any suitable modulation sequence, as directed by encoding stage 324.

The light modulated by optical modulator 320 can be delivered to a directional coupler 340 that splits the light into multiple beams. Directional coupler 340 can receive the light on the coupler's input port and transmit a portion of the received light to an output port to produce a first TX beam 342. The remaining light is outputted by the coupled port of directional coupler 340 to generate a second TX beam 344. Under ideal conditions, the fourth (isolated) port of directional coupler 340 leaks no or very little light. In some implementations, the power of the first TX beam 342 and the second TX beam 344 can be the same (or approximately the same). The first TX beam 342 and the second TX beam 344 can be delivered to a respective first interface coupler 360 and second interface coupler 362. In some implementations, the interface couplers 360 and 362 can be grating couplers or any other suitable directional switches configured to direct TX beams along the desired direction or several different directions in space. Each interface coupler can implement a different sensing pixel corresponding to a respective spatial direction probed by optical sensing system 300. In some implementations, interface couplers 360 and 362 can direct the first TX beam 342 and the second TX beam 344 towards collimating lenses, polarizers, and other optical elements.

The transmitted beams can interact with an object or multiple objects in the outside environment and generate reflected beams that can propagate back towards the optical sensing system 300. The reflected beams can be received through the same interface couplers 360 and 362 and propagate towards the directional coupler 340 as part of a first RX beam 364 and a second RX beam 365. At least one of the RX beams (e.g., the second RX beam 365) can be a phase-controlled beam, as described below. Each of the RX beams can include (in addition to the light reflected from the object(s) in the environment) a light retro-reflected from various optical components of PIC 301, including any portion of interface couplers 360 and 362 (e.g., light retro-reflected from diffraction gratings), waveguide openings, collimator lenses, and/or any other intervening optical elements.

Relative phase of the first RX beam 364 and the second RX beam 365 can be controlled by a phase shifter 348, which can operate similarly to phase shifter 248, as described above in conjunction with FIG. 2. Phase shifter 348 can be used to ensure destructive interference between retro-reflected portions of the two RX beams, when the first RX beam 364 and the second RX beam 365 are combined by directional coupler 340 into a combined beam 366. More specifically, directional coupler 340 can pass a portion (e.g., half) of each of the RX beams to the port that outputs the combined beam 366. Correspondingly, phase shifter 348 can cause the second RX beam 365 to acquire an additional π phase relative to the first RX beam 364. In some implementations, optical paths taken by the TX beams and RX beams between directional coupler 340 and interface couplers 360 and 362 can be similar in length and subject to similar environmental changes (e.g., temperature and humidity). Accordingly, in some implementations, phase shifter 348 can be configured statically, e.g., during manufacturing or in the course of a scheduled maintenance/calibration, to provide a π-phase boost to one of the RX beams (the second RX beam 365 in FIG. 3) relative to the other beam. In some implementations, for additional accuracy and efficiency of retro-reflection suppression, phase shifter 348 can be dynamically configured using a feedback loop that includes an amplitude-phase control module 384, e.g., as described above in conjunction with FIG. 2.

The combined beam 366 can be processed together with LO beam 314 by an optical hybrid stage 370 and coherent detection stage 380, as described above in conjunction with FIG. 2. Similarly, electrical signal J representative of the in-phase current and (if 90-degree optical hybrid is used) the quadrature current produced by the coherent detection stage 380 can be digitized by ADC 382 and provided to an amplitude-phase control module 384, for identifying optimal settings of phase shifter 348, and DSP 390, for using the light reflected from the object(s) to identify distances and/or velocities of the object(s). More specifically, the generated photocurrent J can be representative of the product $$(E_{Ref\text{-}1}+E_{Ref\text{-}2}+E_{RR\text{-}1}+E_{RR\text{-}2})E^*_{LO},$$

where $E_{Ref\text{-}1}$ is an object-reflected part of the first RX beam 364, $E_{Ref\text{-}2}$ is an object-reflected part of the second RX beam 365, $E_{RR\text{-}1}$ is the retro-reflected part of the first RX beam 364, and $E_{RR\text{-}2}$ is the retro-reflected part of the second RX beam 365. The amplitude-phase control module 384 can be configured to optimize settings of phase shifter 348 that minimize the DC domain contribution $$(E_{RR\text{-}1}+E_{RR\text{-}2})E^*_{LO}$$

to the photocurrent J.

The remaining part of the photocurrent $$(E_{Ref\text{-}1}+E_{Ref\text{-}2})E^*_{LO}$$

can then be used by DSP 290 to obtain Doppler shifts $f_{D1}$, $f_{D2}$ and delay times (times of flight) $\tau_1$, $\tau_2$ associated with propagation of light to and from the object(s) and determine the distances to the object(s) and velocities of the object(s), e.g., as described in conjunction with FIG. 2. Although FIG. 3 illustrates only phase shifter 348 as part of the retro-reflection suppression loop, in some implementations, phase shifter 348 can be used together with an amplitude changer to control the amplitude of the phase-controlled beam, e.g., similar to amplitude changer 246 of FIG. 2. In some implementations, the amplitude-phase control module 384 can perform retro-reflection suppression by optimizing both the phase and the amplitude of the phase-controlled beam.

Figure 4:
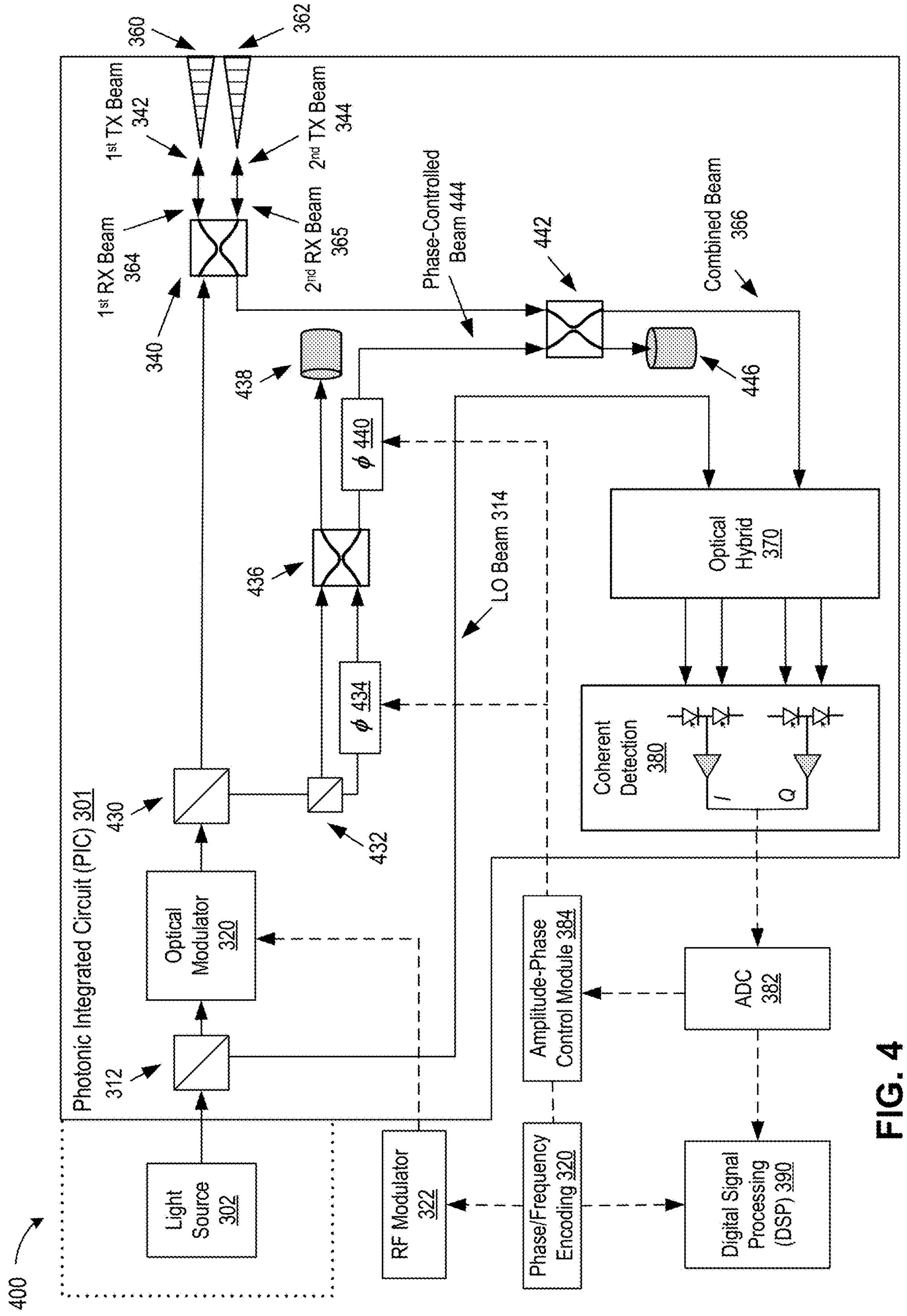
FIG. 4 is a block diagram illustrating another example implementation of an optical sensing system capable of suppression of retro-reflected light by using multiple phase shifters, in accordance with some implementations of the present disclosure.

FIG. 4 is a block diagram illustrating another example implementation of an optical sensing system 400 capable of suppression of retro-reflected light by using multiple phase shifters, in accordance with some implementations of the present disclosure. Although some components of the optical sensing system 400 are depicted as implemented on a PIC 401, it should be understood that the same or a similar functionality can be achieved with optical elements that are connected by optical fibers or use free space light delivery. Various components of optical sensing system 400 that have the same numbers as the corresponding components of optical sensing system 300 can have the same or a similar functionality.

More specifically, a light source 302 can produce a beam of light, which can be further conditioned and preprocessed by a beam preparation stage (not shown), and delivered, e.g., via optical fiber or free space, to PIC 401. In some implementations, light source 302 is integrated on PIC 401. PIC 401 can include a beam splitter 312 that produces LO beam 314. The rest of the modulated light is delivered to optical modulator 320, which imparts optical modulation, and to beam splitter 430. Beam splitter 430 can be used to direct a portion of the modulated light through a number of optical elements to generate a phase-controlled beam 444 that is used for retro-reflection suppression. As depicted in FIG. 4, beam splitter 432 can direct one half of the portion of light through a phase shifter 434 to one input port of a directional coupler 436 and the second half of the portion of light directly to the other input port of the directional coupler 436. The phase shift α imparted to the first half causes it to interfere with the second half and form a beam with controlled intensity $I_0=|A_0|^2\cos(\alpha/2)$, where $I_0$ is the intensity of each half of the portion of light. Therefore, beam splitter 432, phase shifter 434, and directional coupler 436 serve as an interferometric amplitude changer (e.g., amplitude changer 246 of FIG. 2). The phase of the light beam outputted by the first output port of directional coupler 436 can be processed by a second phase shifter 440 to impart an additional phase to the phase-controlled beam 444. In some implementations, the light outputted by the second output port of directional coupler 436 can be directed to a light stop (absorber) 438. Any of beam splitters 312, 430, and 432 can be implemented as directional couplers. In some implementations, directional coupler 436 can be a beam combiner.

Most of the light modulated by optical modulator 320 can be delivered to directional coupler 340 that generates a first TX beam 342 and a second TX beam 344, e.g., as described in conjunction with FIG. 3. The first TX beam 342 and the second TX beam 344 can be delivered to a respective first interface coupler 360 and second interface coupler 362. The transmitted beams can interact with any object (or multiple objects) in the outside environment and generate reflected beams. The reflected beams can be received through the same interface couplers 360 and 362 and propagate to the directional coupler 340 as part of a first RX beam 364 and a second RX beam 365. The directional coupler 340 can pass a portion (e.g., half) of each of the RX beams to the port that is connected to directional coupler 442 that adds the phase-controlled beam 444 to form the combined beam 366. The second output port of directional coupler 442 can be connected to a light stop (absorber) 446. In some implementations, directional coupler 442 can be a beam combiner that combines two inputs into a single output so that no light stop needs to be deployed.

The combined beam 366 can be processed together with LO beam 314 by an optical hybrid 370 and coherent detection stage 380, as described above in conjunction with FIGS. 3 and 4. The amplitude-phase control module 384 can be configured to optimize settings of both phase shifters 434 and 440 to minimize the DC domain contribution of the retro-reflected light present in the first RX beam 364 and the second RX beam 365. DSP 290 can then determine Doppler shifts $f_{D1}$, $f_{D2}$ . . . and delay times (times of flight) $\tau_1$, $\tau_2$ . . . associated with propagation of the light to and from object(s) in the environment and the distances to the object (s) and also determine the velocities of the object(s), e.g., as described in conjunction with FIG. 2. Although FIG. 4 illustrates an example where two interface couplers 360 and 360 output two TX beams, this is not a requirement. In some implementations, any number of TX beams can be deployed, including one TX beam, three TX beams, four TX beams, and so on.

Figure 5:
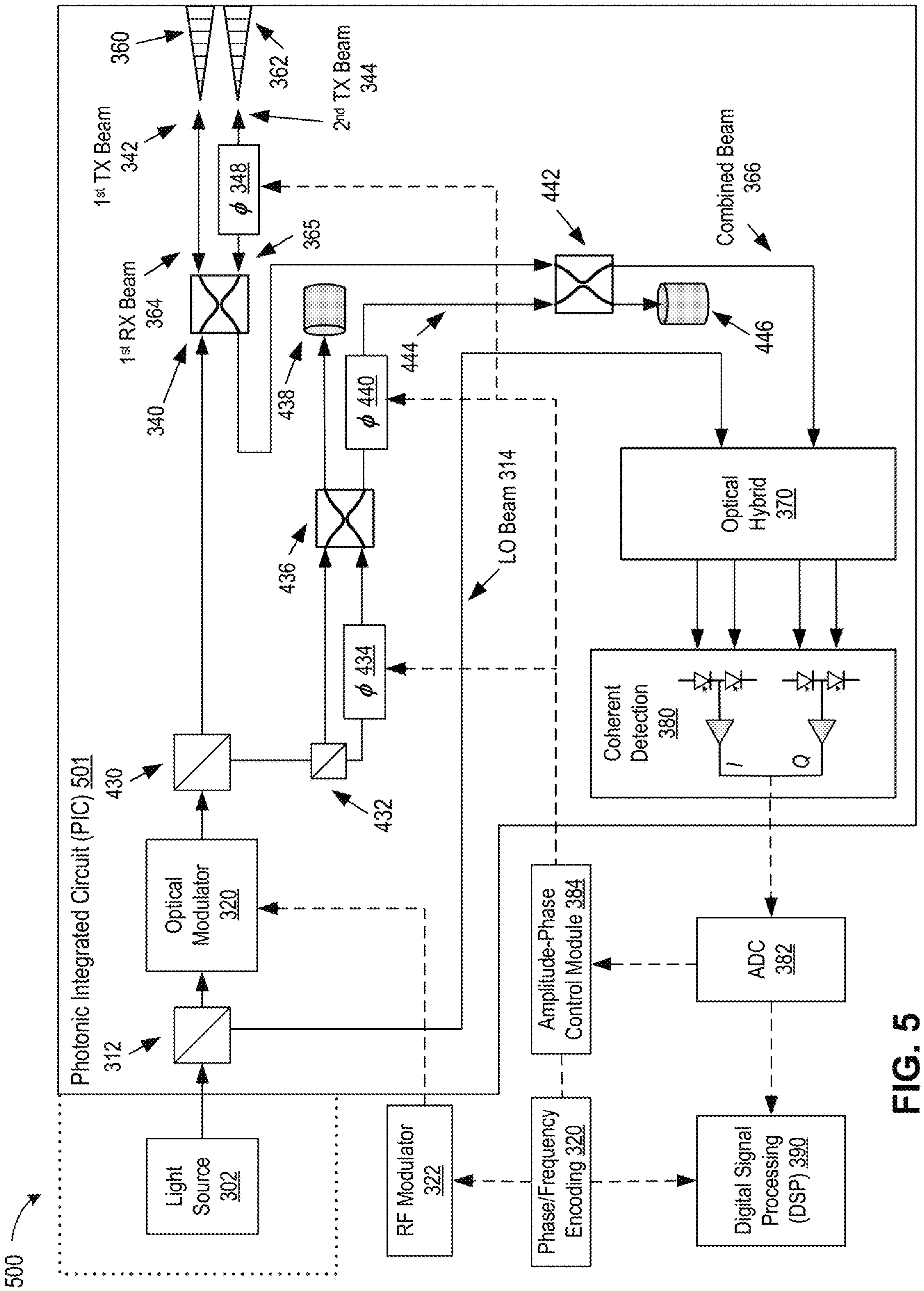
FIG. 5 is a block diagram illustrating another example implementation of an optical sensing system capable of suppression of retro-reflected light by using multiple phase-controlled beams, in accordance with some implementations of the present disclosure.

FIG. 5 is a block diagram illustrating another example implementation of an optical sensing system 500 capable of suppression of retro-reflected light by using multiple phase-controlled beams, in accordance with some implementations of the present disclosure. Although some components of the optical sensing system 500 are depicted implemented on a PIC 501, it should be understood that the same or a similar functionality can be achieved with optical elements that are connected by optical fibers or use free space light delivery. Optical sensing system 500 combines the retro-reflected suppression functionalities of optical sensing system 300 and optical sensing system 400. In particular, optical sensing system 300 generates a phase-controlled beam during TX beam (as in optical sensing system 300) while additionally controlling phase of at least one received beam (as in optical sensing system 400).

More specifically, phase-controlled beam 444 can be prepared substantially as described in conjunction with optical sensing system 400 of FIG. 4 and can be delivered to one input port of directional coupler (or beam combiner) 442. The second input of directional coupler 442 can receive a combination of the first RX beam 364 and the second RX beam 365, of which at least one beam (e.g., the second RX beam 365 in the example in FIG. 4) is phase-controlled by phase shifter 348. The combined beam 366 produced by directional coupler 442 can then be processed as described above in conjunction with FIGS. 2-4. In particular, the amplitude-phase control module 348 can be configured to optimize settings of the phase shifters, 348, 434 and 440 to achieve a more complete suppression of retro-reflections. As a result, optical sensing system 500 implements efficient two-stage suppression, with the first stage occurring when the relative phase of two (or more) received beams is adjusted to eliminate one part (e.g., most) of retro-reflected light and the second stage occurring when the mixture of the received beams is combined with the phase-controlled copy of the transmitted beam(s). The second stage is further capable of eliminating retro-reflected light that occurs earlier in the transmission and, therefore, cannot be suppressed by the first stage, e.g., a part of the transmitted light that leaks towards directional coupler 442 due to imperfections of directional coupler 340. Although FIG. 5 illustrates an example where two interface couplers 360 and 360 output two TX beams, this is not a requirement. In implementations, any number of TX beams can be used, including one TX beam, three TX beams, four TX beams, and so on.

PICs deployed in optical sensing systems 200, 300, 400, and 500 (or other similar sensing systems) can be implemented on a single chip (substrate), e.g., Silicon chip, Silicon Oxide chip, Indium Phosphate chip, Silicon Nitride chips, diamond-based chips, and the like, and can integrate multiple optical elements and functions. PICs can be manufactured using multiple materials, e.g., III-V compound semiconductors (GaAs, InSb, etc.) integrated with Silicon or Germanium. The chip can be manufactured using any suitable methods of lithography, epitaxy, physical vapor deposition, chemical vapor deposition, plasma-assisted deposition, or any other suitable techniques of wafer-scale technology. PICs can operate in the visible light domain (300-700 nm wavelength) or in the infrared domain (above 1000 nm). PICs can include components designed and manufactured to generate light, guide light, manipulate light by changing amplitude, frequency, phase, polarization, spatial and temporal extent of light, transform energy of light into other forms, such as energy of electric current, energy of mechanical vibrations, heat and the like.

PICs can include any number of integrated light sources, such as light-emitting diodes (LEDs), semiconductor lasers diodes, quantum dot lasers (e.g., quantum dot lasers monolithically grown on Silicon), Germanium-on-Silicon lasers, Erbium-based lasers, Raman lasers, integrated III-V compound semiconductors on Si substrate, and the like. In some implementations, PICs can operate on light generated by lasers and other light sources located off-chip and delivered to PICs via any number of optical switches and optical fibers.

PICs can include any number of waveguides, which can serve as elemental building blocks of a PIC's light transportation system, connecting various elements and components. Waveguides can include metallic waveguides, dielectric waveguides, doped semiconductor waveguides, and the like. Waveguides can be single-mode waveguides or multi-mode waveguides. Waveguides can be passive waveguides or active waveguides with gain medium, which can increase the amplitude of the light guided therethrough. Dielectric waveguides can be engineered with high refractive index layers surrounded by lower refractive index materials, which can be deposited and shaped to a designed form using deposition and etching manufacturing techniques.

PICs can include any number of beam splitters, e.g., power splitters, beam combiners, directional couplers, grating couplers, and the like. PICs can include optical circulators, e.g., Faraday effect-based circulators, birefringent crystal-based circulators, and so on. PICs can include any number of optical amplifiers, such as Erbium-doped amplifiers, waveguide-integrated amplifiers, saturation amplifiers, and the like. PICs can further include any number of phase shifters, such as optomechanical phase shifters, electrooptical phase shifters, e.g., shifters operating by exercising electrical or mechanical control of the refractive index of an optical medium, and the like.

PICs can include any number of optical modulators, including indium phosphide modulators, Lithium Niobate modulators, Silicon-based modulators, acousto-optic modulators, electro-optic modulators, electro-absorption modulators, Mach-Zehnder modulators, and the like. In some implementations, optical modulators can use carrier injection, radiation amplification, and other techniques. Optical modulators can include various optomechanical components, e.g., components that modulate the refractive index of a waveguide due to the displacement of a mechanically moveable part placed next to the waveguide, which in turn induces a phase shift (or a directional shift) to the propagating light field.

PICs can include any number of single-photon detectors, e.g., superconducting nanowire single-photon detectors (SNSPDs) or superconducting film single-photon detectors, which can be integrated with diamond or silicon substrates. PICs can include any number of interferometers, such as Mach-Zehnder interferometers.

PICs can include any number of multiplexers/demultiplexers, including wavelength division multiplexers/demultiplexers, phased-array wavelength multiplexers/demultiplexers, wavelength converters, time division multiplexers/demultiplexers, and the like.

PICs can further include any number of photodetectors, including silicon photomultipliers, photodiodes, which can be Silicon-based photodiodes, Germanium-based photodiodes, Germanium-on-Silicon-based photodiodes, III-V semiconductor-based (e.g., GaAs-based) photodiodes, avalanche photodiodes, silicon photomultipliers (SiPMs), and so on. Photodiodes can be integrated into balanced photodetector modules, which can further include various optical hybrids, e.g., 90-degree hybrids, 180-degree hybrids, and the like.

Figure 6:
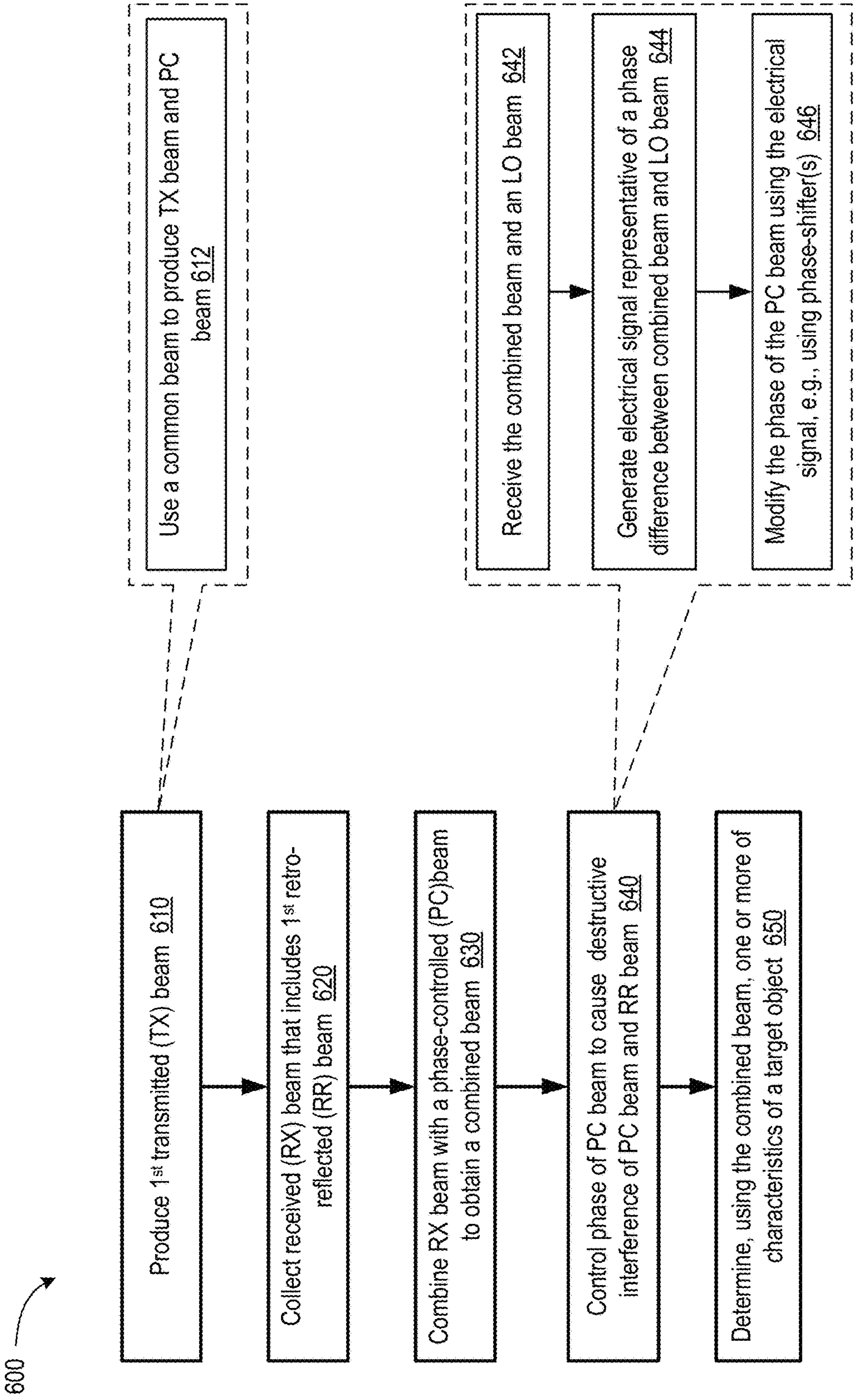
FIG. 6 depicts a flow diagram of an example method of suppression of retro-reflected light by using a phase-controlled beam generated in conjunction with a transmitted beam preparation, in accordance with some implementations of the present disclosure.
Figure 7:
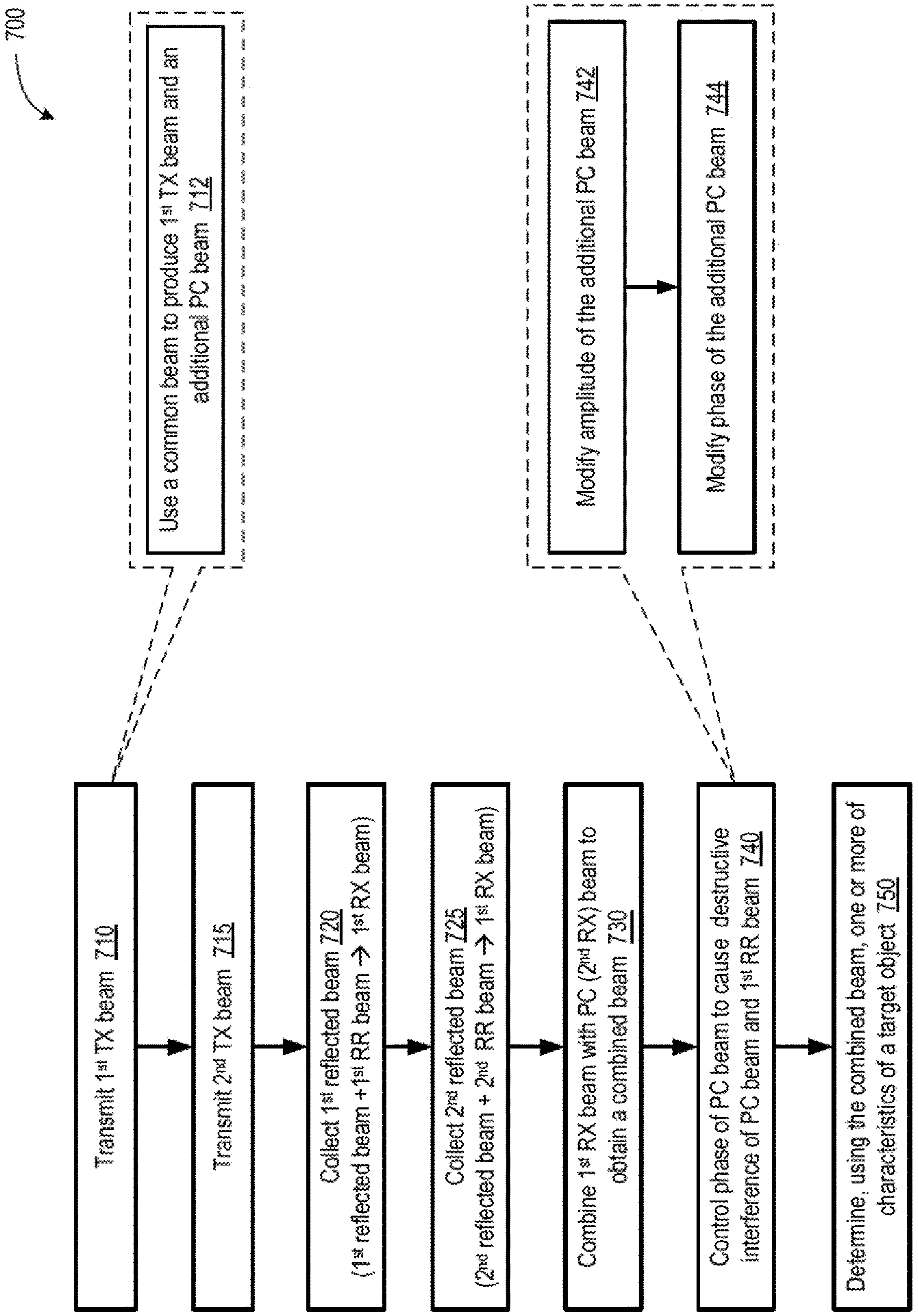
FIG. 7 depicts a flow diagram of an example method of suppression of retro-reflected light by controlling a relative phase of multiple received beams, in accordance with some implementations of the present disclosure.

FIG. 6 and FIG. 7 depict flow diagrams of example methods 600 and 700 of interference suppression of retro-reflected light in lidar systems using the techniques described above. Methods 600 and 700 can be performed using systems and components described in relation to FIGS. 1-5, e.g., optical sensing system 200 of FIG. 2, optical sensing system 300 of FIG. 3, optical sensing system 400 of FIG. 4, optical sensing system 500 of FIG. 5, and/or various modifications or combinations of the aforementioned sensing systems, which can be implemented, e.g., as part of a lidar apparatus. Methods 600 and 700 can be performed as part of obtaining range and velocity data that characterizes any suitable environment, e.g., an outside environment of a moving vehicle, including but not limited to an autonomous vehicle. Various operations of methods 600 and 700 can be performed in a different order compared with the order shown in FIG. 6 and FIG. 7. Some operations of methods 600 and 700 can be performed concurrently with other operations. Some operations can be optional. Methods 600 and 700 can be used to improve efficiency and reliability of velocity and distance detections by lidar devices.

FIG. 6 depicts a flow diagram of an example method 600 of suppression of retro-reflected light by using a phase-controlled beam generated in conjunction with a transmitted beam preparation, in accordance with some implementations of the present disclosure. Method 600 can include producing, at block 610, a transmitted (TX) beam (e.g., TX beam 242 of FIG. 2 or first TX beam 342 of FIG. 3). In some implementations, the TX beam can be any one (e.g., first, and second) TX beam of a plurality of TX beams simultaneously generated by the lidar system. In some implementations, as indicated by block 612 of the top callout portion of FIG. 6, the TX beam can be generated together with a phase controlled beam, e.g., using a first beam splitter (e.g., beam splitter 240 of FIG. 2 or beam splitter 430 of FIG. 4). More specifically, the first beam splitter can be configured to produce the first TX beam and the phase-controlled beam using a common beam (e.g., beam outputted by optical modulator 220 of FIG. 2 or optical modulator 320 of FIG. 4).

At block 620, method 600 can continue with collecting a received (RX) beam (e.g., RX beam 264 of FIG. 2 or first RX beam 364 of FIG. 5). The RX beam can be collected through any suitable optical interface, which can include apertures, lenses, gratings couplers, optical fiber ends, waveguide openings, and the like. In some implementations, the RX beam can be any one (e.g., first, and second) RX beam of a plurality of RX beams simultaneously collected through one or multiple optical interfaces. The RX beam can include a corresponding (e.g., first, and second) reflected beam caused by interaction of the respective TX beam with an object (e.g., a first object, and a second object) in the outside environment. The RX beam can further include a corresponding (e.g., first, and second) retro-reflected (RR) beam caused by interaction of the respective (e.g., first, and second) TX beam with one or more internal components of the lidar system (e.g., of the lidar transceiver).

At block 630, method 600 can continue with combining (using any suitable beam combiner, or beam splitter 252 of FIG. 2, a beam combiner, or directional coupler 442 of FIG. 4 and FIG. 5) the RX beam with the phase-controlled beam to obtain a combined beam (e.g., combined beam 266 of FIG. 2 or combined beam 366 of FIG. 4 and FIG. 5).

At block 640, method 600 can continue with one or more circuits (e.g., optical and electronic circuits) controlling a phase of the phase-controlled beam to cause at least partial destructive interference of the phase-controlled beam and the RR beam. As illustrated with the bottom callout portion of FIG. 6, controlling the phase difference can include a number of operations. For example, at block 642, method 600 can include receiving the combined beam and a local oscillator (LO) beam by a coherent photodetector. The coherent photodetector can have multiple photodiodes, each photodiode receiving a portion of the combined beam and a portion of the LO beam. Some of the received portions can be phase-shifted (e.g., by optical hybrid stage 270 of FIG. 2, or optical hybrid stage 370 of FIG. 4 and FIG. 5). At block 644, method 600 can include generating an electrical signal representative of a difference between the combined beam and the LO beam (e.g., photocurrent outputted by coherent detection stage 280 of FIG. 2, or coherent detection stage 380 of FIG. 4 and FIG. 5). At block 646, method 600 can include modifying the phase of the phase-controlled beam using the generated electrical signal to cause at least partial destructive interference of the phase-controlled beam and the RR beam. e.g., by controlling one or more settings of a suitable phase shifter (e.g., phase shifter 248 of FIG. 2, or phase shifter 440 of FIG. 4 and FIG. 5).

In some implementations, the one or more settings of the phase shifter can be modified responsive to an occurrence of a triggering condition. For example, the triggering condition can include a passage of a predetermined time, or a change in one or more of environmental conditions. For example, such changes can include a change of the temperature of the environment, a change of a humidity of the environment, a change of the pressure of the environment, and the like.

In some implementations, the characteristics of the phase-controlled beam can controlled by an amplitude changer (e.g., amplitude changer 246 of FIG. 2) connected in series with the phase shifter (e.g., phase shifter 248 of FIG. 2) and configured to modify an amplitude of the phase-controlled beam. In some implementations, the amplitude changer can be implemented using a beam splitter and an additional phase shifter. More specifically, a second beam splitter (e.g., beam splitter 432 of FIG. 4) can be configured to split the phase-controlled beam into a plurality of component beams (e.g., the two component beams incident on input ports of directional coupler 436 of FIG. 4). An additional phase-shifter (e.g., phase shifter of FIG. 4) can be configured to modify a phase of at least one of the plurality of component beams of the phase-controlled beam (e.g., the bottom component beam incident on directional coupler 436 of FIG. 4). An optical combiner (e.g., directional coupler 436 of FIG. 4) can be configured to combine the plurality of component beams of the phase-controlled beam (e.g., to obtain phase-controlled beam 444 of FIG. 4).

At block 650, method 600 can include determining (e.g., by DSP 290 of FIG. 2 or by DSP 390 of FIG. 4) using the combined beam, one or more of characteristics of the object (e.g., object 262 of FIG. 2). The characteristics of the object can include a distance of the object and a speed of the object.

Any of the optical components referenced in conjunction with the performance of method 600 can be implemented on a photonic integrated circuit (PIC). The PIC can include (but need be limited to) one or more laser light sources configured to generate the first TX beam, one or more optical interfaces, one or more optical couplers (e.g., directional couplers, beam splitters, and beam combiners), one or more phase shifters, and the like. The PIC can further include a plurality of waveguides to guide the first TX beam, the phase-controlled beam, and the combined beam, and any other beams.

FIG. 7 depicts a flow diagram of an example method 700 of suppression of retro-reflected light by controlling a relative phase of multiple received beams, in accordance with some implementations of the present disclosure. At block 710, method 700 can include transmitting a first TX beam (e.g., first TX beam 342 of FIG. 2 or FIG. 5) using a first optical interface (e.g., interface coupler 360 of FIG. 2 or FIG. 5). At block 715, method 700 can include transmitting a second (third, etc.) TX beam (e.g., second TX beam 344 of FIG. 2 or FIG. 5) using a second, third, etc., optical interface (e.g., interface coupler 362 of FIG. 2 or FIG. 5). Each of the first optical interface, second optical interface, etc., can be a waveguide opening (with or without a collimating lens), an optical fiber end, a diffraction grating coupler, and the like. In some implementations, the first TX beam and the second TX can be produced from a common beam, e.g., as depicted in FIG. 2 and FIG. 5, directional coupler 340 (or any suitable beam splitter) can split the common beam into the first TX beam 342 and the second TX beam 344.

At block 720, method 700 can include collecting the first reflected beam. The first reflected beam can be caused by interaction of the first TX beam with some object in the environment (referred to as the first object herein). At block 725, method 700 can include collecting a second reflected beam. The second TX beam can be caused by interaction of the second TX beam with the first object or a different, second, object (if the angle of propagation between the first TX beam and the second TX beam is such that these beams strike different objects). In a monostatic configuration of the lidar transceiver, each of the first reflected beam and the second reflected beam can be collected through the optical interface used to output the respective TX beam.

The first reflected beam together with a first retro-reflected (RR) beam constitute a first received (RX) beam (e.g., first RX beam 364 in in FIG. 2 and FIG. 5). The RR component of the first RX beam can be caused by interaction of the first TX beam with various components of the lidar transceiver, e.g., with the first optical interface. Similarly, the second reflected beam together with a second RR beam constitute a second RX beam (e.g., second RX beam 365 in in FIG. 2 and FIG. 5). The RR component of the second RX beam can be caused by interaction of the second TX beam with various components of the lidar transceiver, e.g., with the second optical interface.

At block 730, method 700 can continue with combining the first RX beam with the second RX beam to obtain a combined beam (e.g., combined beam 366 of FIG. 3 and FIG. 5). In some implementations, the combining can be performed by the same device that was used to split the combined beam into the first TX beam and the second TX beam, e.g., by directional coupler 340 of FIG. 3 and FIG. 5.

At block 740, method 700 can continue with one or more circuits (e.g., optical and electronic circuits) controlling a phase of the phase-controlled beam to cause at least partial destructive interference of the phase-controlled beam (e.g., the second RX beam 365 that includes the second RR beam) and the first RR beam. Controlling the phase of the phase-controlled beam (e.g., second RX beam 365 of FIG. 3 and FIG. 5) can be performed using a phase shifter (e.g., phase shifter 348 of FIG. 3 and FIG. 5).

In some implementations, as illustrated by block 712 of the top callout portion of FIG. 7, a second phase controlled beam (referred to as an additional phase-controlled beam herein) can be used to achieve a more efficient suppression of the retro-reflected light. For example, the additional phase-controlled beam 444 of FIG. 5 can be produced from the same common beam (e.g., outputted by optical modulator 320 of FIG. 5) that is used to produce the first TX beam (e.g., using beam splitter 430).

As illustrated with the bottom callout portion of FIG. 7, suppression of the retro-reflected light with the additional phase-controlled beam can include a number of operations. More specifically, at block 742, method 700 can include modifying the amplitude of the additional phase-controlled beam, e.g., using an amplitude changer. In some implementations, the amplitude changer can include beam splitter 432, phase shifter 434 and a beam combiner or directional coupler 436, all shown in FIG. 5. As further indicated with block 744, method 700 can include modifying the phase of the additional phase-controlled beam, e.g., using an additional phase shifter. The additional phase shifter (e.g., phase shifter 440 of FIG. 5) can be connected in series with the amplitude changer. The combined effect of the additional phase shifter and the amplitude changer can be to cause at least partial destructive interference of the additional phase-controlled beam (e.g., phase-controlled beam 444 of FIG. 5) with the residuals of the first RR beam and/or the second RR beam remaining in the combined beam (e.g., as outputted by directional coupler 340 of FIG. 5) after initial destructive interference has been achieved with phase shifter 348.

At block 750, method 700 can include determining (e.g., by DSP 390 of FIG. 5), using the combined beam (e.g., combined beam 366), one or more of the characteristics of the first object and/or the second object. The characteristics of the object(s) can include distances to the object(s) and the speed(s) of the object(s).

Any of the optical components referenced in conjunction with performance of method 700 can be implemented on a photonic integrated circuit (PIC). The PIC can include (but need be limited to) one or more laser light sources configured to generate the first TX beam, one or more optical interfaces, one or more optical couplers (e.g., directional couplers, beam splitters, and beam combiners), one or more phase shifters. The PIC can further include a plurality of waveguides to guide the first TX beam, the phase-controlled beam, and the combined beam and the like.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as “identifying,” “determining,” “storing,” “adjusting,” “causing,” “returning,” “comparing,” “creating,” “stopping,” “loading,” “copying,” “throwing,” “replacing,” “performing,” or the like, refer to the action and processes of a computer system, or similar electronic computing device, that manipulates and transforms data represented as physical (electronic) quantities within the computer system’s registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it can prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A system comprising:
a lidar transceiver configured to:
produce a first transmitted (TX) beam and a second TX beam;
collect a first received (RX) beam comprising:
a first reflected beam caused by interaction of the first TX beam with a first object, and
a first retro-reflected (RR) beam caused by interaction of the first TX beam with one or more internal components of the lidar transceiver;
collect a second RX beam comprising:
a second reflected beam caused by interaction of the second TX beam with the first object or a second object, and
a second RR beam caused by interaction of the second TX beam with the one or more internal components of the lidar transceiver; and
combine the first RX beam with the second RX beam to obtain a combined beam; and
one or more circuits configured to:
control a phase of the second RX beam to cause at least partial destructive interference between the first RR beam and the second RR beam; and
determine, using the combined beam, one or more characteristics of at least one of the first object or the second object.

2. The system of claim 1, further comprising:
a first beam splitter configured to produce, using a common beam, the first TX beam and a phase-controlled beam; and
a phase shifter configured to modify the phase of the phase-controlled beam.

3. The system of claim 2, wherein the one or more circuits comprise a coherent photodetector configured to:
receive the combined beam and a local oscillator (LO) beam; and
generate an electrical signal representative of a difference between the combined beam and the LO beam; and
wherein the one or more circuits are further configured to control one or more settings of the phase shifter using the electrical signal to cause at least partial destructive interference of the phase-controlled beam with a residual of one or both of the first RR beam and the second RR beam remaining in the combined beam.

4. The system of claim 3, wherein the one or more circuits are configured to control the one or more settings of the phase shifter responsive to an occurrence of a triggering condition, the triggering condition comprising at least one of a passage of a predetermined time, or a change in at least one of a temperature of an environment, a humidity of the environment, or a pressure of the environment.

5. The system of claim 2, further comprising:
an amplitude changer connected in series with the phase shifter and configured to modify an amplitude of the phase-controlled beam.
6. The system of claim 5, wherein the amplitude changer comprises:
a second beam splitter configured to split the phase-controlled beam into a plurality of component beams;
an additional phase-shifter configured to modify a phase of at least one of the plurality of component beams of the phase-controlled beam; and
an optical combiner configured to combine the plurality of component beams of the phase-controlled beam.
7. The system of claim 1, wherein the lidar transceiver comprises:
a first optical interface configured to transmit the first TX beam and collect the first RX beam; and
a second optical interface configured to transmit the second TX beam and collect the second RX beam; and
an optical coupler configured to combine the first RX beam with the second RX beam to obtain the combined beam.
8. The system of claim 7, wherein the optical coupler is further configured to produce the first TX beam and the second TX beam from a common beam.
9. The system of claim 1, further comprising:
a first beam splitter configured to produce, from a common beam, the first TX beam and a phase-controlled beam;
an amplitude changer configured to modify an amplitude of the phase-controlled beam; and
a phase shifter, connected in series with the amplitude changer, configured to modify a phase of the phase-controlled beam to cause at least partial destructive interference of the phase-controlled beam with a residual of one or both of the first RR beam and the second RR beam remaining in the combined beam.
10. The system of claim 7, wherein each of the first optical interface and the second optical interface comprise a grating coupler.
11. The system of claim 7, further comprising a photonic integrated circuit (PIC), the PIC comprising:
a plurality of waveguides to guide the first TX beam, and the combined beam,
the first optical interface,
the second optical interface, and
the optical coupler.
12. The system of claim 11, wherein the PIC further comprises one or more laser light sources configured to generate the first TX beam.
13. The system of claim 1, wherein the one or more characteristics comprise a distance and a speed of one or both of the first object and the second object.
14. A lidar apparatus comprising:
a photonic integrated circuit (PIC) comprising:
a light source configured to generate a light beam;
an optical coupler configured:
to produce, using the light beam, a first transmitted (TX) beam and a second TX beam, and
to produce, by combining a first received (RX) beam and a second RX beam, a combined beam;
a first optical interface configured to output the first TX beam and to obtain the first RX beam, the first RX beam comprising (i) a first reflected beam caused by interaction of the first TX beam with a first object and (ii) a first retro-reflected (RR) beam caused by the first TX beam;
a second optical interface configured to output the second TX beam and to obtain the second RX beam, the second RX beam comprising (i) a second reflected beam caused by interaction of the second TX beam with the first object or a second object and (ii) a second RR beam caused by the second TX beam; and
a first phase shifter configured to modify the phase of the second RX beam; and
one or more electronic circuits configured to:
control settings of the first phase shifter to cause at least partial destructive interference of the first RR beam and the second RR beam; and
determine, using the combined beam, one or more characteristics of at least one of the first object or the second object.
15. The lidar apparatus of claim 14, wherein the PIC further comprises:
a first beam splitter configured to produce, using the light beam, a phase-controlled beam;
an amplitude changer configured to modify an amplitude of the phase-controlled beam; and
a second phase shifter, connected in series with the amplitude changer and configured to modify the phase of the phase-controlled beam to cause at least partial destructive interference of the phase-controlled beam with a residual of the first RR beam and/or the second RR beam remaining in the combined beam.
16. A method to operate a lidar transceiver, comprising:
producing a first transmitted (TX) beam and a second TX beam;
collecting a first received (RX) beam comprising:
a first reflected beam caused by interaction of the first TX beam with a first object, and
a first retro-reflected (RR) beam caused by interaction of the first TX beam with one or more internal components of the lidar transceiver;
collecting a second RX beam comprising:
a second reflected beam caused by interaction of the second TX beam with the first object or a second object;
a second RR beam caused by interaction of the second TX beam with one or more internal components of the lidar transceiver;
combining the first RX beam with the second RX beam to obtain a combined beam;
controlling a phase of the second RX beam to cause at least partial destructive interference between the first RR beam and the second RR beam; and
determining, using the combined beam, one or more characteristics of at least one of the first object or the second object.
17. The method of claim 16, wherein producing the first TX beam comprises splitting a common beam into the first TX beam and a phase-controlled beam, and wherein the method further comprises modifying a phase of the phase-controlled beam using a phase shifter.
18. The method of claim 17, wherein controlling the phase of the phase-controlled beam comprises:
generating an electrical signal representative of a difference between the combined beam and a LO beam;
and wherein modifying the phase of the phase-controlled beam using the electrical signal causes at least partial destructive interference of the phase-controlled beam with a residual of one or both of the first RR beam and the second RR beam remaining in the combined beam.

19. The method of claim 16, further comprising:

producing, using the first TX beam, a phase-controlled beam;

modifying an amplitude of the phase-controlled beam; and modifying a phase of the phase-controlled beam to cause at least partial destructive interference of the phase-controlled beam with a residual of the first RR beam and/or the second RR beam remaining in the combined beam.

20. The method of claim 18, wherein modifying the phase of the phase-controlled beam using the electrical signal is performed responsive to an occurrence of a triggering condition, the triggering condition comprising at least one of a passage of a predetermined time, or a change in at least one of a temperature of an environment, a humidity of the environment, or a pressure of the environment.

* * * * *